United States Patent
Coleman

(10) Patent No.: US 7,859,237 B2
(45) Date of Patent: Dec. 28, 2010

(54) METHOD AND APPARATUS FOR VOLTAGE TO CURRENT CONVERSION

(75) Inventor: Edward P. Coleman, Salt Springs, FL (US)

(73) Assignee: Texas Instruments Incorporated, Dallas, TX (US)

( * ) Notice: Subject to any disclaimer, the term of this patent is extended or adjusted under 35 U.S.C. 154(b) by 169 days.

(21) Appl. No.: 11/770,537

(22) Filed: Jun. 28, 2007

(65) Prior Publication Data

US 2008/0088346 A1 Apr. 17, 2008

Related U.S. Application Data

(60) Provisional application No. 60/830,225, filed on Jul. 12, 2006.

(51) Int. Cl.
 *G05F 1/40* (2006.01)
(52) U.S. Cl. .................. 323/282; 363/21.01
(58) Field of Classification Search ......... 315/149–152, 315/224–225, 247, 291, 307; 362/227, 253, 362/257; 323/282–288, 222; 363/16–20
 See application file for complete search history.

(56) References Cited

U.S. PATENT DOCUMENTS

| | | | | |
|---|---|---|---|---|
| 5,668,552 A | * | 9/1997 | Thurston | 341/143 |
| 5,905,867 A | * | 5/1999 | Giorgio | 709/224 |
| 6,150,802 A | * | 11/2000 | Andrews | 323/282 |
| 6,437,545 B2 | * | 8/2002 | Sluijs | 323/222 |
| 6,808,607 B2 | * | 10/2004 | Christie | 204/298.08 |
| 7,511,437 B2 | * | 3/2009 | Lys et al. | 315/307 |

* cited by examiner

*Primary Examiner*—Rajnikant B Patel
(74) *Attorney, Agent, or Firm*—Steven A. Shaw; W. James Brady; Frederick J. Telecky, Jr.

(57) ABSTRACT

A voltage to current converter that can provide multiple current sources at differing voltage levels using a single inductor, without the need to provide a current sense element, pass element, and wiring to provide feedback for load current regulation. A switching inductor current is regulated such that the average current supplied by the inductor is equal to a user determined set point or points for a set of multiplexed loads. The inductor current levels are sampled and stored, and the average current level for each load is determined based on the sampled current levels. The average current levels are compared to a current level set point or set point signals to determine an error signal for each load current. The error signal for each current is amplified and filtered to provide duty cycle control terms. The duty cycle control terms are converted to pulse width modulated control signals by a pulse width modulator. The pulse width modulated control signals control the duration of switch states to energize and discharge the inductor to provide regulated average current levels to the multiple load channels.

5 Claims, 16 Drawing Sheets

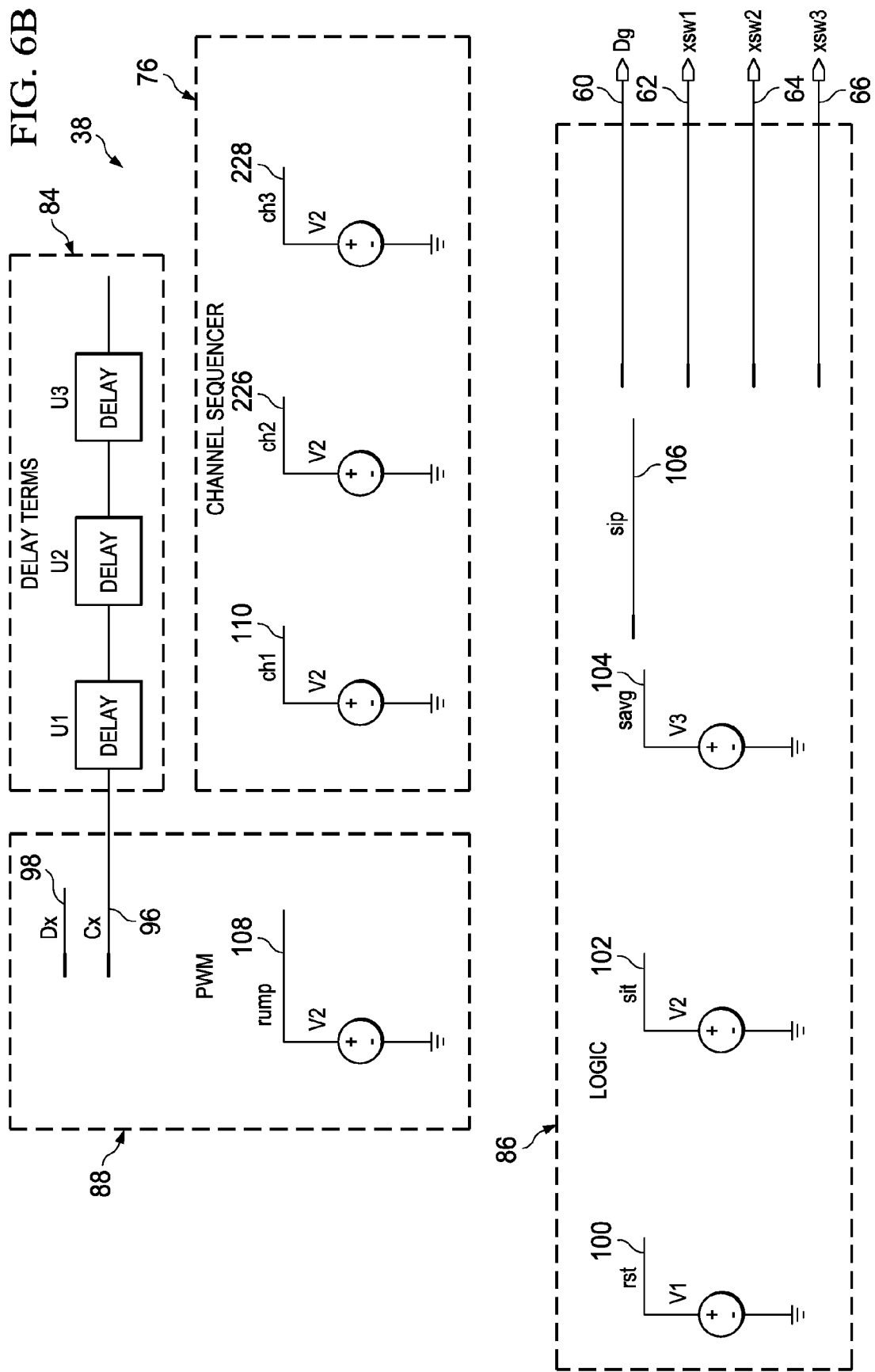

□ V(U2.ch1)    ◇ V(U2.ch2)+ 3    ▽ V(U2.ch3)+ 6    △ V(U2.sip)+ 9
○ V(U2.sit)+ 12    + V(U2.savg)+15    × V(U2.xsw1)+18    ∧ V(U2.xsw2)+21
∨ V(U2.xsw3)+24    □ V(Dg)+27    ◊ I(L1)*10+23.9

METHOD AND APPARATUS FOR VOLTAGE TO CURRENT CONVERSION

CROSS-REFERENCE TO RELATED APPLICATIONS

This patent application claims priority under 35 USC 119 from Provisional Patent Application No. 60/830,225 filed Jul. 12, 2006, which is incorporated herein by reference for all purposes.

FIELD OF THE INVENTION

The present invention relates to power conversion and, more particularly, to driving loads at selectable current levels from a voltage power source input.

BACKGROUND OF THE INVENTION

Efficient power conversion from a voltage source such as a battery or rectified and filtered AC source provides current for single or multiple loads is important in many consumer products. Load devices that require controlled current sources for proper operation include light emitting diodes (LEDs), LASERs, CPUs, battery chargers, lamps, and heater elements to name a few.

In lighting applications multiple matching current sources are required to reduce voltage stresses on power conversion components while insuring uniform brightness. Current sources must operate at high voltage levels to drive loads such as LEDs that are connected in series. For example 21 LEDs in series would require approximately 75V output capability to provide 20 mA of current to the 21 LED devices in series. If the same 21 LEDs are driven by 3 matching current sources each driving 7 LEDs than the output of each current source will only have to operate at 25V to provide 20 mA of LED current to the 7 LED devices in series. Often power converters are implemented as integrated circuits (ICs) where the voltage capability of the process used to make the integrated circuit (IC) has a negative impact on IC die area, which reduces yield and increases the cost of each IC.

Often a single power source is used to provide power that is used in different physical locations in an application. To reduce cost, loads that require a fixed current level must be supplied current from a single wire with the chassis providing a return path for the current. The power converter frequently has to step up the input voltage, which increases the current level in the wiring from the voltage source to the converter, and reduces the current needed to deliver power to the loads. Therefore, it is important to be able to locate the converter near the voltage source, and minimize the number of wires that are required to drive remotely located loads.

High efficiency power conversion is also important especially in applications where the input power source is a battery. Efficient operation increases the operating time between battery charges, and improves product reliability. Reliability is improved by decreasing the component power losses, and thus the heat that those losses produce.

Finally, portable products have size, weight, and cost limitations that are essential to meet the needs of present and emerging applications. Power conversion for generating current sources must be designed with high levels of integration and minimal component count.

Existing current source power converters typically use a single voltage to voltage converter such as a boost converter to produce a fixed voltage source. The fixed voltage source is used to provide current to the load or loads with a separate current sense element, series pass element, and control loop for each load. The current sense element, series pass element, and control loop regulate the load currents as the forward voltage drop of the loads vary due to temperature, life, or variations in the component manufacturing process.

Another approach to current source power converters is to use separate boost converters where each load requires a current sense element, series pass element, and control loop to maintain accurate current levels. This improves efficiency by allowing each stack of series load elements to operate at their minimum or most efficient voltage level. For example, if the forward voltage drop of the loads in series is 25V then the converter can be set to operate with a regulated voltage of 26V, where there is 1V across the series pass element used to regulate current. There is still a loss in the pass element used to control the load current, but it has been reduced. In each approach the load current is sensed continuously.

The single voltage to voltage converter approach with multiple loads, each having separate current sensing and current control loops has many disadvantages. As multiple channels are added to address multiple loads, multiple current sense elements and wires need to be added to provide feedback signals for the current control loops. The single voltage to voltage converter has to be set to a fixed voltage that is sufficiently high to supply current to the load with the highest voltage requirements. Loads that need less voltage have to dissipate power in the pass element to maintain current regulation. The approach requires precisely matched loads. Unmatched loads result in low efficiency. The current sensing components and current sense feedback wiring add cost, size and weight.

The use of multiple boost converters for each load with remote current sensing for feedback to a current control loop, and series pass element improves efficiency by allowing the voltage to be set to the minimum level that is required for current regulation. However, this approach adds an inductor and filter capacitor for each current source in addition to the wires and current sense elements that are needed to control current.

When the load current is sensed continuously, the current sense element can be selected to provide a high gain current sense signal. This improves the signal to noise ratio, but the sense element has to be a higher impedance element, which results in high current sense element power losses. The current sense element can be selected to lower sense element power losses, which improves efficiency of operation, but the current sense signal gain is decreased resulting in a lower signal to noise ratio.

There is a need for a voltage to current converter that can provide multiple current sources at differing voltage levels using a single inductor, without the need to provide a current sense element, pass element, and wiring to provide feedback for load current regulation. The existing solutions for driving current source loads do not meet the present or future needs of power conversion for current dependent loads. A new approach is needed.

It is therefore an object of the invention to provide a voltage to current power converter.

It is another object of the invention to provide a voltage to current power converter that is capable of supplying current to a plurality of loads using a single inductor.

It is another object of the invention to provide a voltage to current power converter that has regulated current source outputs without requiring current sense elements, pass elements, and wiring to provide feedback for load current regulation.

It is another object of the invention to provide a voltage to current power converter that operates more efficiently by not requiring continuous load current sensing.

It is another object of the invention to provide a voltage to current power converter with reduced weight, size, and cost by reducing the number of components that are required to supply current to a plurality of loads.

BRIEF SUMMARY OF THE INVENTION

In accordance with the present invention, there is provided a voltage to current converter that can provide multiple current sources at differing voltage levels using a single inductor, without the need to provide a current sense element, pass element, and wiring to provide feedback for load current regulation. A switching inductor current is regulated such that the average current supplied by the inductor is equal to a user determined set point for a plurality of multiplexed loads. The inductor current levels are sampled and stored, and the average current level for each load is determined based on the sampled current levels. The average current levels are compared to current level set point signals to determine an error signal for each load current. The error signal for each current is amplified and filtered to provide duty cycle control terms. The duty cycle control terms are converted to pulse width modulated control signals by a pulse width modulator. The pulse width modulated control1 signals control the duration of switch states to charge (energize) and discharge (deenergize) the inductor to provide regulated average current levels to the plurality of loads.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DETAILED DESCRIPTION OF THE PREFERRED EMBODIMENT

Definitions

Figure 1:
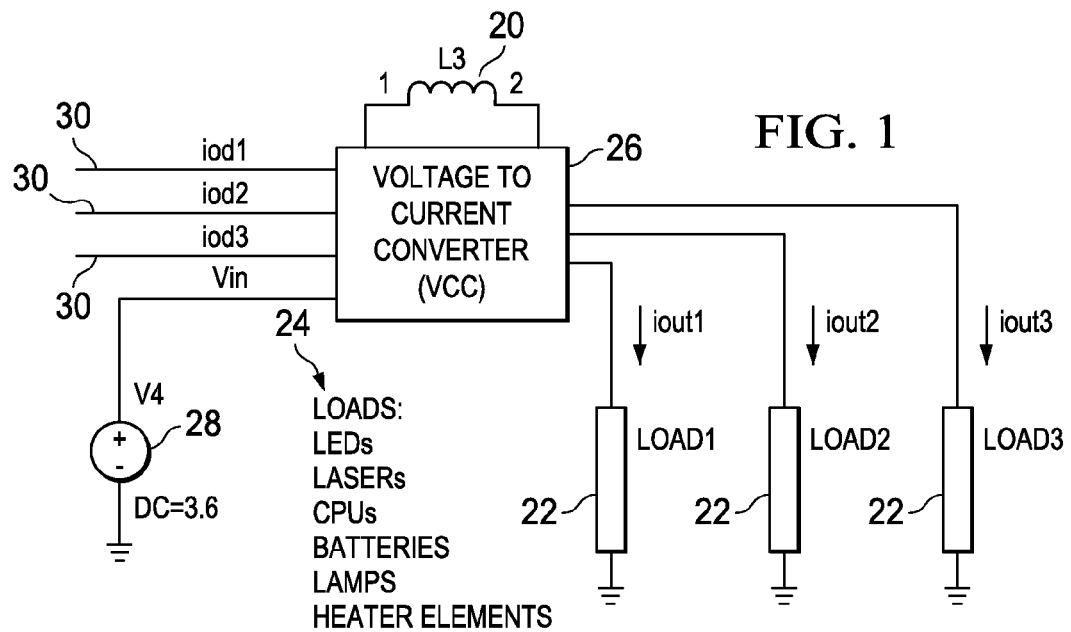
FIG. 1 is a schematic view of a three output voltage to current converter (VCC)

The Switching Cycle is the duration between two consecutive charge cycles. The switching cycle is equal to the period of the operating frequency of the converter. Thus, if the operating frequency to the converter is 100 k Hz, the switching cycle if 10 microseconds long.

The Channel Period is equal to the N times the switching cycle, where N is the number of output load channels serviced or driven by one converter.

An Output Current Source, or Output Channel, or Channel is a current driver output.

The Duty Cycle (D) is the ratio of the charge duration relative to the switching cycle duration.

The Switching Frequency is the operating frequency of the power converter.

The Switching Period or Switching Duration is the amount of time required to complete one switching cycle.

The Charge Cycle, Charge Duration, Switch on time, Energy Charge Duration, or Charge Duration refers to the portion of the switching cycle that is used to charge the inductor 20 or magnetic storage element.

The Trough Charge Current is the inductor or magnetic element current level corresponding to the start of a charge cycle or end of a transfer cycle.

The Peak Charge Current is the inductor or magnetic element current level corresponding to the end of a charge cycle or beginning of a transfer cycle.

Beginning and End of charge or transfer cycle is approximately at or near the beginning or end relative to the duration of the switching cycle.

The Inductor or Magnetic Storage element is the component of components in a power converter system that store energy in the form of a magnetic field.

The Output Filter Capacitor or Charge Storage element is the component of components in a power converter system that stores energy in the form of an electrostatic field.

The Transfer Duration, Switch off time, Energy Transfer Duration, or Transfer Duration refer to the portion of the switching cycle that is used to transfer the stored magnetic energy or inductor 20 energy to the charge storage element or output filter capacitor and load.

The Demand Value, Demand Signal, Current Set Point, or Target Value is an input parameter to parameter or parameters in the case of multiple channels to set the output current level or levels of the power converter channels.

A power converter is operating in Continuous Current Mode when the magnetic storage element energy is either increasing or decreasing for each charge of transfer duration, and the charge, sample, and transfer durations sum to equal the switching period. Since the magnetic field is proportional to the magnetic storage element current, the magnetic storage element current is also either increasing or decreasing for each switching cycle.

Simulation Results:

FIGS. 10-15 were generated using the system model depicted in FIGS. 5-9, and Cadence PSPICE version 10.3.0 software (Cadence Design Systems, San Jose, Calif.). PSPICE is a commercially available simulation software package used by design engineers to design and simulate circuits and related systems. PSPICE is a "Simulation Program with Integrated Circuit Emphasis" or SPICE program SPICE was developed by the Electrical Engineering and Computer Sciences Department at the University of California, Berkeley. The diagrams depicted in FIGS. 10-15 are simulation results of PSPICE circuit simulation models. They demonstrate a workable model that serves as a basis for a design implementation. Those skilled in the art can utilized the model diagrams, and simulation results to construct a working design. The models use a combination of discrete component models, Analog Hardware Description Language (AHDL) statements, and Behavior models. The AHDL statements, and Behavior models can be implemented in a variety of ways with simple electronic circuits, This model enables a design engineer to demonstrate a systems approach or method to address a problem or set of requirements without constraining the design to one implementation or technology. Modeling of this nature is a common approach to systems design for complex systems.

PRIOR ART

Figure 2:
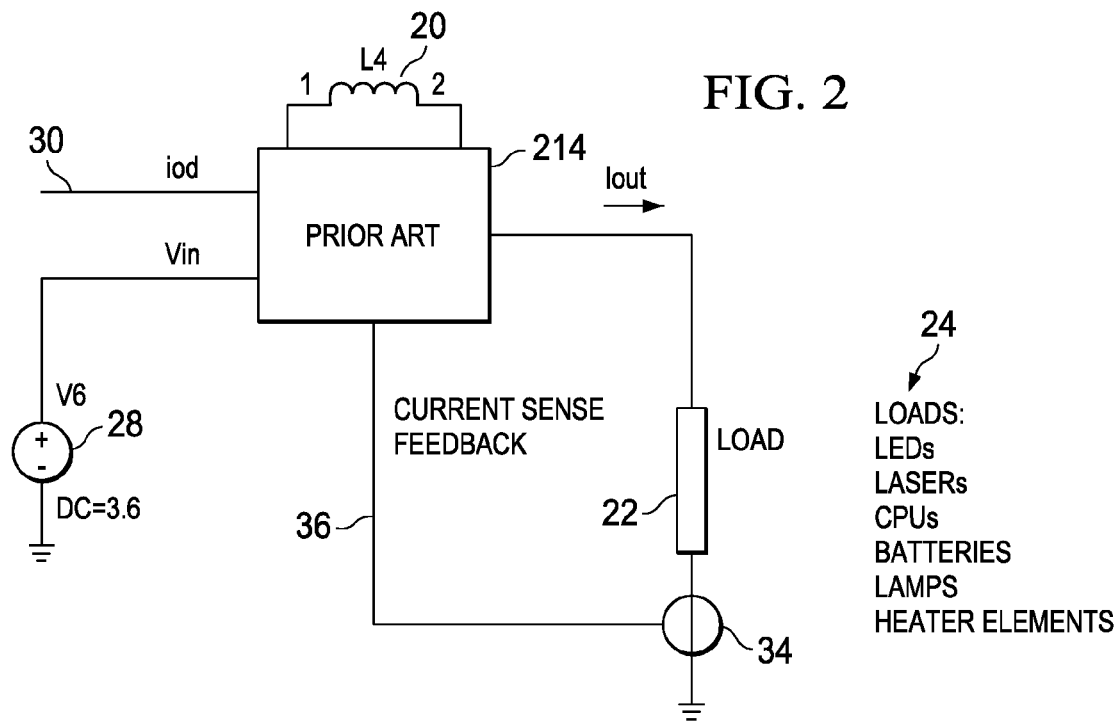
FIG. 2 is a schematic view of the prior art.

FIG. 2 is a schematic view of a prior art converter. This example uses an inductor based boost converter 214 cascaded with a current sense element 34, and includes a current sense feedback wire 36. The fixed voltage source 28 is used to provide current to the load or loads 22 with a separate series pass element within the converter, and a control loop within the converter for each load. The current sense element 34, series pass element, and control loop regulate the load currents as the forward voltage drop of the loads 22 vary due to temperature, life, or variations in the manufacturing process. In this example of prior art the load current is sensed continuously.

The use of multiple boost converters for each load with remote current sensing for feedback to a current control loop and series pass element permits the boost output voltage to be set to the minimum level that is required for current regulation. However, this approach adds an inductor 20 and filter capacitor for each current source within the inductor based boost converter 214 in addition to the current sense feedback wires and current sense elements that are needed to control current. These added components add cost, weight, and size to the design solution, and also waste power, lowing overall power conversion efficiency.

Introduction to the Voltage to Current Converter (VCC):

FIG. 1 is a schematic view of a three output Voltage to Current Converter 26 (VCC). The three output Voltage to Current Converter 26 (VCC) is supplied power from the voltage source 28. The energy from the voltage source 28 is stored in the inductor 20. The energy that is stored in the inductor 20 is transferred to the loads 22 as controlled output current sources iout1, iout2, and iout3. The voltage to current converter 26 switches the inductor 20 from a charge cycle where the inductor 20 is connected in series with the voltage source 28 for a short charging period. After a set the charging period the inductor 20 is connected from the voltage source 28 to one of the three loads 22, and discharges into the load. Each load receives current as the inductor 20 is charged during a charging period, and then discharged during a transfer period into one of the three loads 22. The example load list 24 is provided to illustrate the types of loads 22 that require or benefit from being driven by a Voltage to Current Converter 26 current source output or channel. This list is not meant to limit the loads 22 to the types of loads 22 listed, but only to serve as a illustration of some of the types of loads 22 that may be driven by a Voltage to Current Converter 26.

A Voltage to Current Converter 26 is described for a three load application to illustrate the basic principles of operation of the converter. The example used to introduce voltage to current conversion is not meant to limit the number of loads 22 that can be driven. It is possible to drive a fraction of a load in the case to two of more voltage to current converters driving one load in parallel, or a single, or plurality of loads 22 being driven by one or more voltage to current converters in combination.

Figure 3:
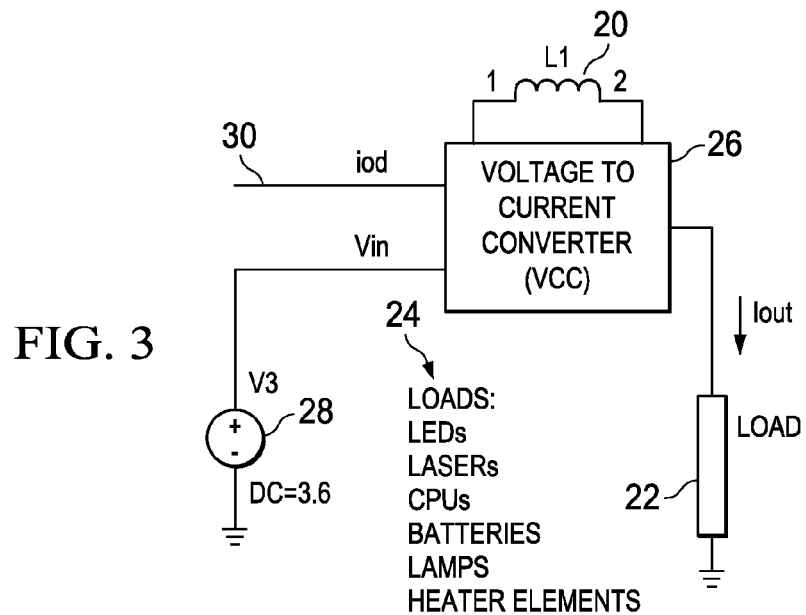
FIG. 3 is a schematic view of a single output voltage to current converter.

FIG. 3 is a schematic view of a single output implementation of a voltage to current converter 26. The average output current into the load is controlled by a current set point 30 iod. The single output voltage to current converter 26 does not require channel control and cross-coupled feedback. It is also possible to apply multiple voltage to current converters to a single load where power for one load must be provided by more than one voltage source 28.

Figure 4:
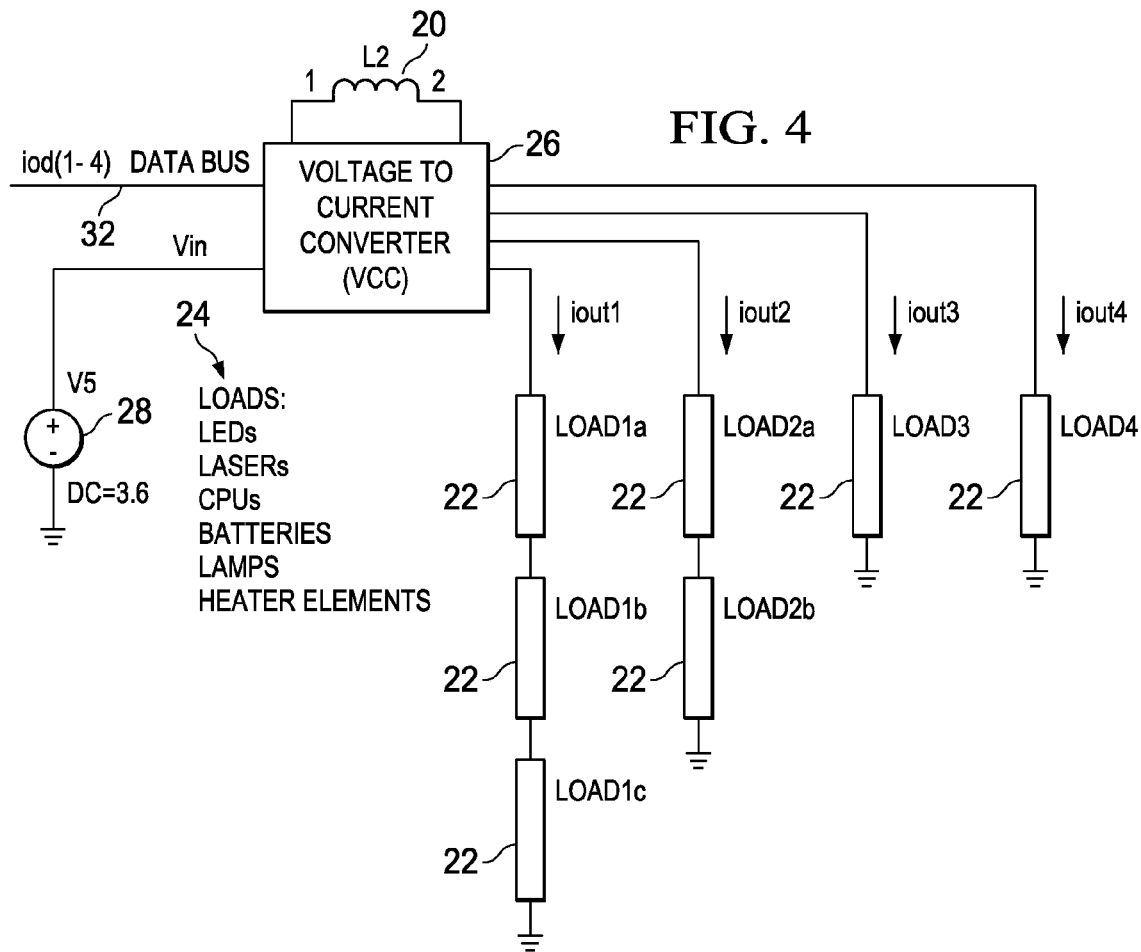
FIG. 4 is a schematic view of a multiple output voltage to current converter.

FIG. 4 is a schematic view of a four channel voltage to current converter 26. The loads 22 in this example are separated into four converter output channels, and some loads 22 are comprised of multiple series load elements. The voltage to current converter 26 is capable of providing current to a plurality of loads 22 channels with a diversity of output voltage requirements. The output current is controlled to set each channel current to the values set by the current set point bus 32. The current is regulated precisely taking into account charge imbalance due to varying output voltage levels. For example, If one channel requires twice the voltage of an adjacent channel then it will have twice the charge loss as the inductor 20 charges parasitic capacitances before it reaches the voltage level that is needed to supply current to the load.

FIGS. 5-9 provide the schematic views of the preferred embodiment example of a three output voltage converter system model. The symbols and expression statements used to construct this model are primitive Cadence PSPICE version 10.3.0 model symbols (Cadence Design Systems, San Jose, Calif.). The schematics shown in FIGS. 5-9 can be utilized by a person of typical skill level in the art to construct a working model and accompanying voltage to current converter, and to obtain the simulation results provided in FIGS. 10-15. Furthermore, detailed waveforms for current, voltage, and power can be obtained for every signal node and pin for the entire model. FIGS. 10-15 are a representative set of simulation results, but are a subset of the information available from the working model as disclosed.

Preferred Embodiment Overview

FIGS. 5-9 provide schematic views of a preferred embodiment example of a three output voltage converter system model. The symbols and expression statements used to construct this model are primitive Cadence PSPICE version 10.3.0 model symbols (Cadence Design Systems, San Jose, Calif.). The schematics shown in FIGS. 5-9 can be utilized by an electrical engineer of typical skill level to construct a working model and obtain the simulation results provided in FIGS. 10-15, and build a working voltage to current converter. Furthermore, detailed waveforms for current, voltage, and power can be obtained for every node and pin for the entire model schematic set shown in FIGS. 5-9. FIGS. 10-15 are a representative set of simulation results, but are a small fraction of the information available from the working model as disclosed. The simulation results shown in FIGS. 10-15 were selected to aid in describing the operation on a three channel voltage to current converter 26 provided as the preferred embodiment of the invention. This model is not to be construed as limiting the invention to a three channel application. The three channel application was selected as a simple example application to describe the points of novelty of the invention.

Figure 5A:
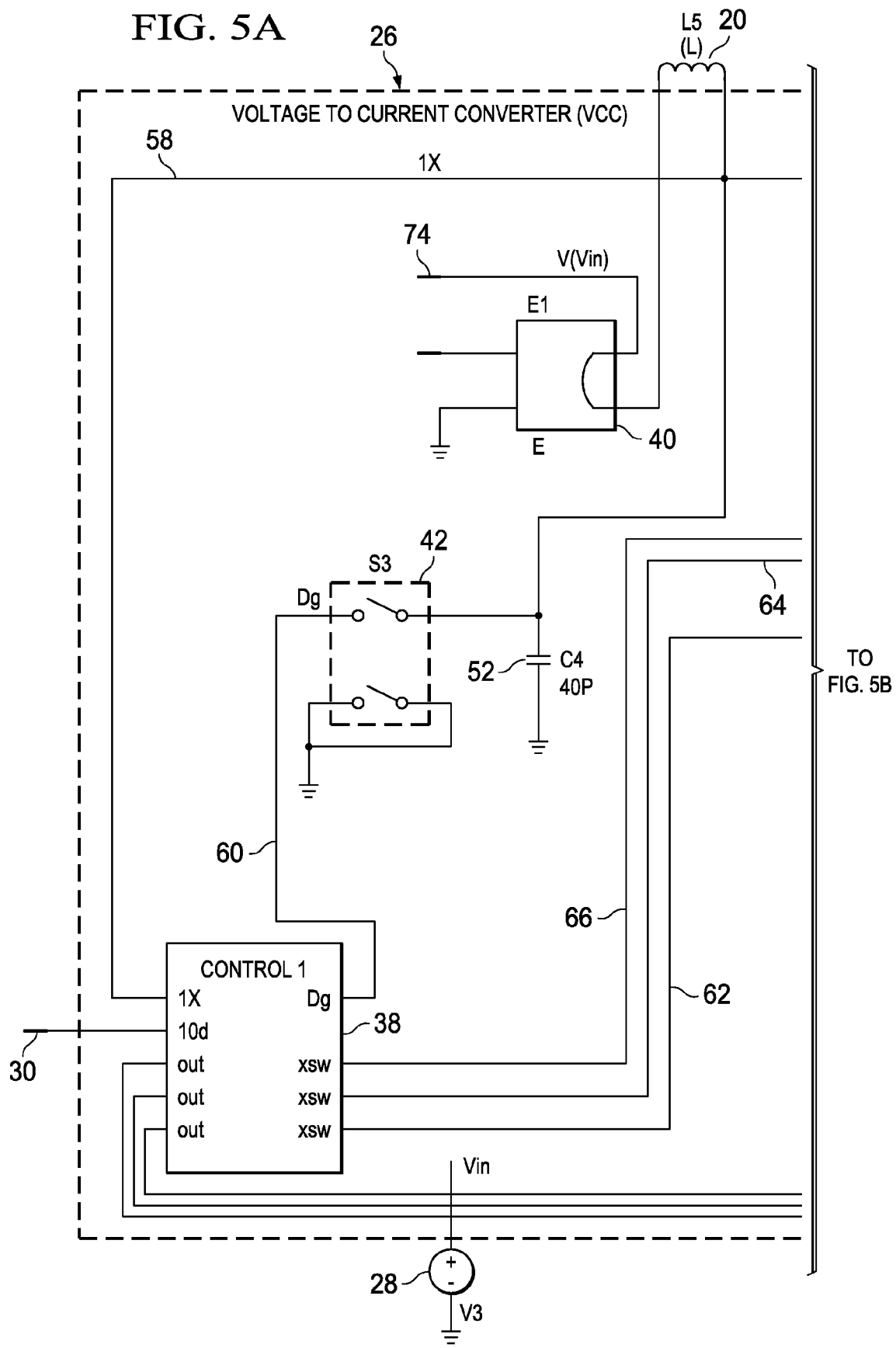
FIG. 5 is a schematic view of a three output voltage to current converter system model.
Figure 5B:
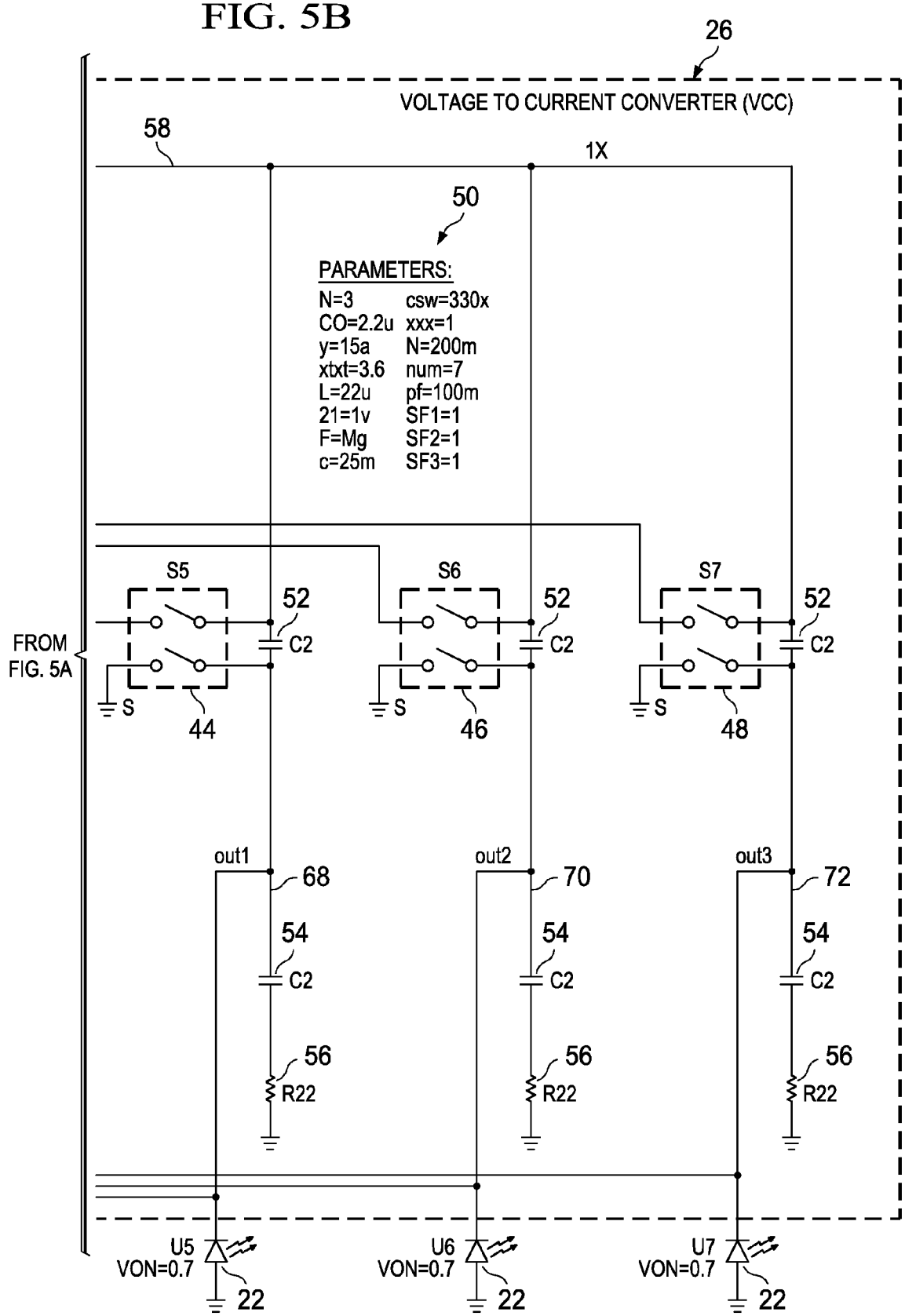

FIG. 5, which is a schematic view of a three output Voltage to Current Converter 26 system model. A voltage source 28 provides power for conversion to accurate current source outputs. The current source outputs channels out1 node 68, out2 node 70 and out3 node 72 are connected to three loads 22 as illustrated in the model schematic. The inductor 20 is used as an energy storage and transfer element. An inductor 20 can be efficiently charged by applying a voltage across the inductor 20 to increase the magnitude of the current flowing in the inductor 20. As the inductor 20 current is increased, the energy stored in the inductor 20 also increases. Once the inductor 20 is charged it can be efficiently connected to discharge or apply a decreasing current to a given load. As current decreases the energy stored in the inductor 20 is transferred from the inductor 20 to the load, and output filter capacitor. The current set point 30 is provided to set the average current level applied to each of the three channel loads 22.

A parameter list 50 is provided which provides a global parameter list and the values assigned to each parameter. The parameters are used throughout the model schematics, and the model values are applied to each occurrence of the model parameter character string. For example, The model parameter co is defined to equal 2.2 u in the parameter list 50. The output filter capacitors 54 are set to a value of {co}. The brackets "{ }" enclosing the parameter character string are necessary to comply with Cadence PSPICE syntax rules, and the enclosed character string co provides a reference to the parameter list 50, and the combination "{co}" is interpreted by with Cadence PSPICE as the value 2.2 u. Standard engineering suffixes such as k, Meg, m, u, n, and p are compatible with Cadence PSPICE. Therefore, 2.2 u in interpreted by Cadence PSPICE as the value 0.0000022.

The inductor 20 is connected to a current limiter 40 and is charged by turning on the charge switch 42. The current limiter 40 is connected to a node set to equal the voltage level of the vin node. This is accomplished with an expression symbol 74, and a corresponding expression statement. The expression statement is v(vin). This is an example of Cadence PSPICE syntax for referring to a node voltage in an expression statement. The node label is vin, and when an expression v(vin) is used it means that the value of the voltage at node vin is to be used in the expression. The syntax is used throughout the model to define values used in expression statements.

The current limiter 40 has no effect on inductor 20 current until a preset limit is reached. The preset limit is set to 2 A in this model. The current limit value is set accounting to component stress limits and the requirements of a given application, and may vary broadly depending on the power level of the application being addressed.

When addressing the power needs of channel 1, the charge switch 42 is closed, the current increases in the inductor 20 storing energy in the inductor 20. After a set charge period the charge switch 42 is opened, and the lx node 58 is connected to a current sensing circuit in control1 38. After a short sampling period, the lx node 58 is connected to out1 node 68 through the first transfer switch 44. The polarity of the inductor voltage is inverted in this switch configuration, and results in a decreasing inductor 20 current as energy is transferred from the inductor 20 into the load and output filter capacitor connected to the out1 node 68. Following the transfer cycle, the first transfer switch 44 is turned off, and the lx node 58 is connected to a current sensing circuit in control1 38. After a short sampling period, the lx node 58 is connected to ground through the charge switch 42 to begin the charge and transfer process for the next output channel.

Channel 2 is addressed next. When addressing the power needs of channel 2, the charge switch 42 is closed, the current increases in the inductor 20 storing energy in the inductor 20. After a set charge period the charge switch 42 is opened, and the lx node 58 is connected to a current sensing circuit in control1 38. After a short sampling period, the lx node 58 is connected to out2 node 70 through the second transfer switch 46. The polarity of the voltage is inverted in this switch configuration, and results in a decreasing inductor current as energy is transferred from the inductor 20 into the load and output filter capacitor connected to the out2 node 70. Following the transfer cycle, the second transfer switch 46 is turned off, and the lx node 58 is connected to a current sensing circuit in control1 38. After a short sampling period, the lx node 58 is connected to ground through the charge switch 42 to begin the charge and transfer process for the next output channel.

Channel 3 is addressed next. When addressing the power needs of channel 3, the charge switch 42 is closed, the current increases in the inductor 20 storing energy in the inductor 20. After a set charge period the charge switch 42 is opened, and the lx node 58 is connected to a current sensing circuit in control1 38. After a short sampling period, the lx node 58 is connected to out3 node 72 through the second transfer switch 46. The polarity of the voltage is inverted in this switch configuration, and results in a decreasing inductor current as energy is transferred from the inductor 20 into the load and output filter capacitor connected to the out3 node 72. Following the transfer cycle, the third transfer switch 48 is turned off, and the lx node 58 is connected to a current sensing circuit in control1 38. After a short sampling period, the lx node 58 is connected to ground through the charge switch 42 to begin the charge and transfer process for the next output channel.

It is desirable to transfer energy to each channel in periods that are separated by charging cycles, because the total charge time needed to address all channels is divided into a sequence of shorter charge periods that take place in the intervals between each transfer period. The shorter charge periods result in lower ripple current in the inductor 20 and less core losses for a given switching frequency. The sequencing of the channels can be altered depending on the requirements of a given application. Some channels can be skipped, or addressed contiguously. The charging cycle can be altered to draw power from multiple voltage sources as well as combined into one or a plurality of charge cycles in conjunction with many variations in output channel sequencing.

The Dg node 60 control signal is used to control the state of the charge switch 42. When the Dg node 60 is greater than 0.7V the charge switch 42 is on, and the resistance of the switch is set by the parameter rcsw that is defined in the parameter list 50. When the Dg node 60 is less than 0.5V the switch is off, and the resistance of the switch is 100e6 or 100 Meg Ohms.

The control signals xsw1 node 62, xsw2 node 64, and xsw3 node 66 are used to control the state of the first transfer switch 44, second transfer switch 46, and third transfer switch 48 respectively.

When the xsw1 node 62 is greater than 0.7V the first transfer switch 44 is on, and the resistance of the switch is set by the parameter rxsw, which is defined in the parameter list 50. When the xsw1 node 62 is less than 0.5V the switch is off, and the resistance of the switch is 100e6 or 100 Meg Ohms.

When the xsw2 node 64 is greater than 0.7V the second transfer switch 46 is on, and the resistance of the switch is set by the parameter rxsw, which is defined in the parameter list

50. When the xsw2 node 64 is less than 0.5V the switch is off, and the resistance of the switch is 100e6 or 100 Meg Ohms.

When the xsw3 node 66 is greater than 0.7V the third transfer switch 48 is on, and the resistance of the switch is set by the parameter rxsw, which is defined in the parameter list 50. When the xsw3 node 66 is less than 0.5V the switch is off, and the resistance of the switch is 100e6 or 100 Meg Ohms.

The model includes parasitic switch capacitances 52 and the filter capacitor equivalent series resistances 56. These are included for completeness, and illustrate that the voltage to current converter 26 is capable of providing accurate and precise relative current levels into a plurality of loads 22 at different output voltages and current levels. The parasitic switch capacitances 52 must to be charged and discharged for each switching cycle as the lx node 58 changes voltage for charging, sampling, and transferring energy to loads 22. Since current is the change in charge with time, the parasitic switch capacitances 52 induce current level errors what must be accounted for in controlling the average output current levels.

Figure 6A:
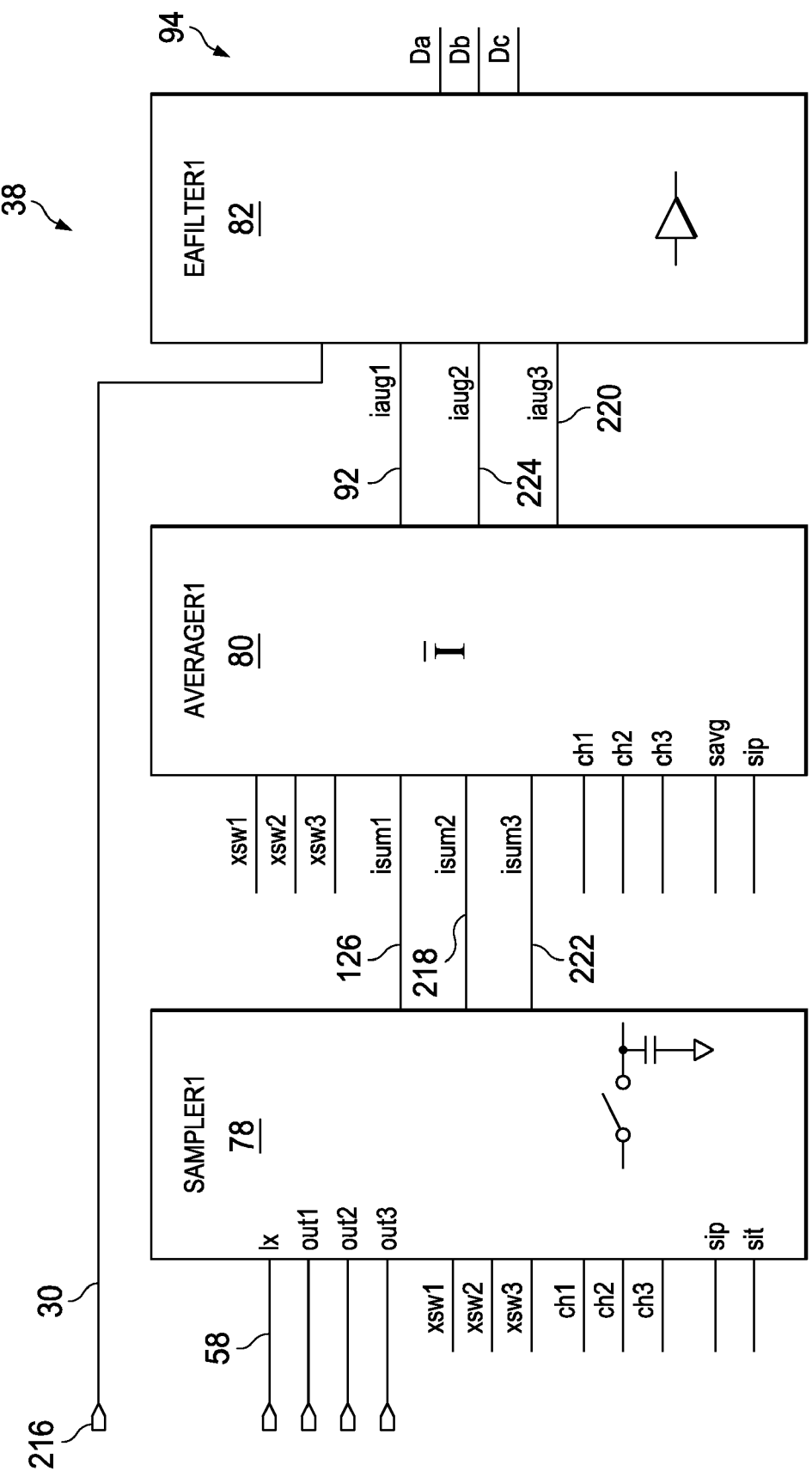
FIG. 6 is a schematic view of a control1 circuit model for a voltage to current converter.

Controller—Control1 38:

FIG. 6 is a schematic view of Control1 38 depicted in FIG. 5. Cadence PSPICE has a hierarchical schematic structure capability. The symbol for control1 38 depicted in FIG. 5 has 9 pins with corresponding pin names. For each pin depicted in the control1 38 symbol there is a corresponding pin interface symbol 216 in FIG. 6. There are 9 pins, each with a corresponding pin interface symbol 216 in FIG. 6 that connect the 9 pins of symbol control1 38 of FIG. 5 to the 9 nodes in FIG. 6. Thus the 9 pin nodes from FIG. 5 are electrically connects to 9 corresponding nodes in FIG. 6. FIG. 6 is a detailed schematic of the circuit model used to implement control1 38.

Control1 38 is comprised of current sampler ISampler1 78, current averager Iaverager1 80, error amplifier filter EAFilter1 82, pulse width modulator PWM 88, Delay terms 84, Channel Sequencer 76, and logic 86. Isampler1 78 takes samples of the inductor 20 current levels prior to and after the inductor 20 is connected to each of the output loads 22. The samples are stored, and updated each time an output channel is connected to the inductor 20.

The sample taken prior to connecting the inductor 20 to the out1 node 68 is summed with the sample taken after the inductor 20 is connected to, then disconnected from the out1 node 68. These two samples are summed to provide the signal at the isum1 node 126.

The sample taken prior to connecting the inductor 20 to the out2 node 70 is summed with the sample taken after the inductor 20 is connected to, then disconnected from the out2 node 70. These two samples are summed to provide the signal at the isum2 node 218.

The sample taken prior to connecting the inductor 20 to the out3 node 72 is summed with the sample taken after the inductor 20 is connected to, then disconnected from the out3 node 72. These two samples are summed to provide the signal at the isum3 node 222.

Isum1 node 126, isum2 node 218, and isum3 node 222 are provided to IAverager1 80, and used to determine the average current values at iavg1 node 92, iavg2 node 224, and iavg3 node 220 that are delivered to each of the channel output loads 22.

The error amplifier filter EAfilter1 82 amplifies the difference between the values of iavg1 node 92, iavg2 node 224, and iavg3 node 220 and the threshold based on the current set point 30 iod. The amplified difference signals are filtered and combined generate the duty cycle nodes 94 Da, Db, and Dc.

The duty cycle nodes 94 Da, Db, and Dc are used to generate the duty cycle term Dx node 98 in the PWM 88. The Dx node 98 is equal to Da when the ch1 node 110 is greater than 0.5. The Dx node 98 is equal to Db when the ch2 node 226 is greater than 0.5. And, Dx node 98 is equal to Dc when the ch3 node 228 is greater than 0.5. The ramp node 108 is compared to the value of the Dx node 98, and when the ramp node 108 is less than the Dx node 98, the CX node 96 is equal to 0. When the ramp node 108 is greater than the DX node 98, the Cx node 96 is equal to 2. The Cx node 96 is the charge transfer signal, and is high (CX node 96=2) when the converter is in charging mode, and low (CX node 96=0) when the converter is in transfer mode. The ch1 node 110, ch2 node 226, and ch4 node are provided by the channel sequencer 76.

The CX node 96 is used to generate delay terms 84 that are used in the control logic 86. The control logic 86 provides the rst node 100 signal to set the model to a known switch state at the start of simulation. The sit node 102 controls trough sampling. The sip node 106 controls peak sampling. The savg node 104 controls average sampling. The Dg node 60 controls the charge switch 42. And, the xsw1 node 62, xsw2 node 64, and xsw3 node 66 control the transfer switches.

Figure 7A:
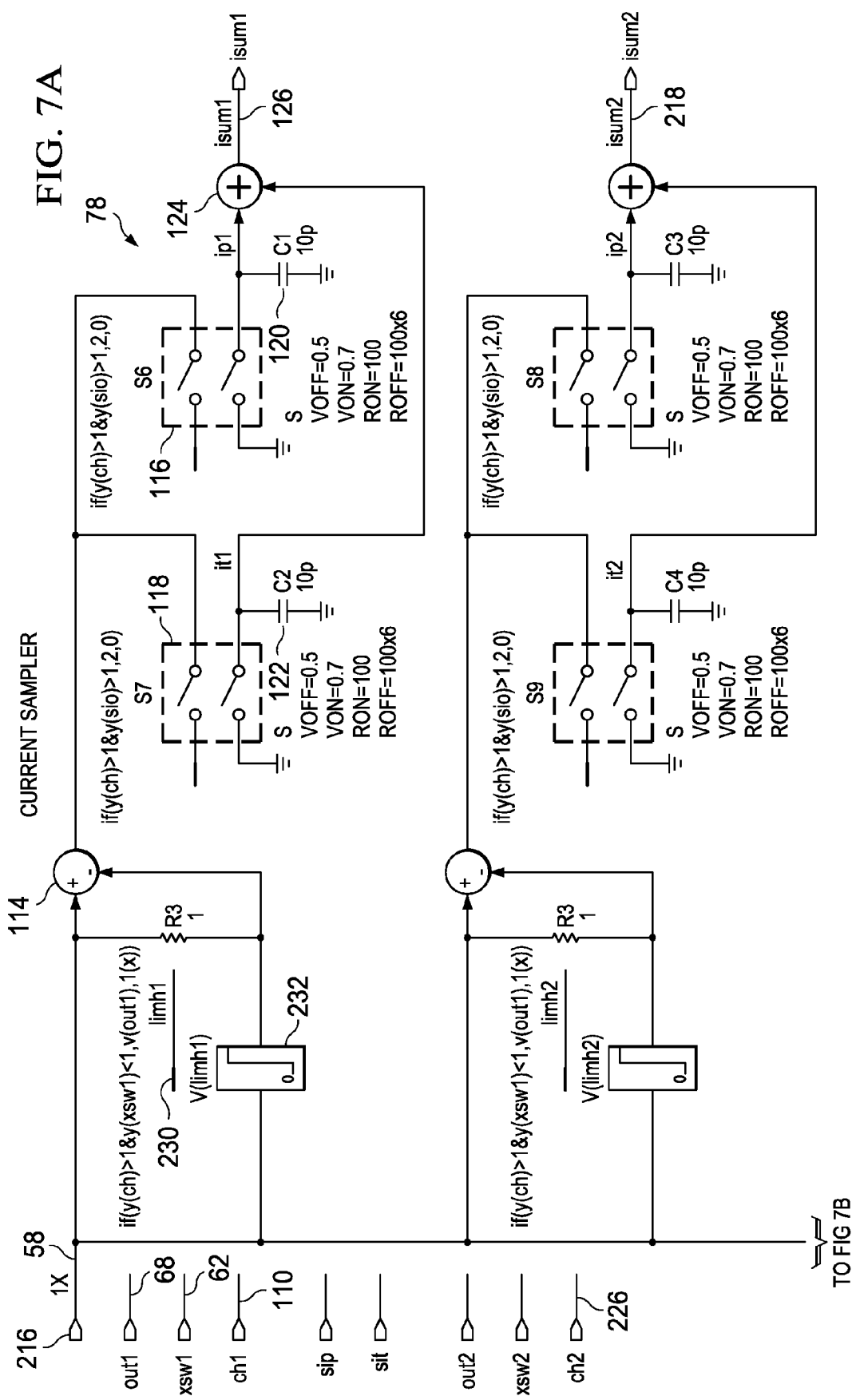
FIG. 7 is a schematic view of an isample1 circuit model for a voltage to current converter.
Figure 7B:
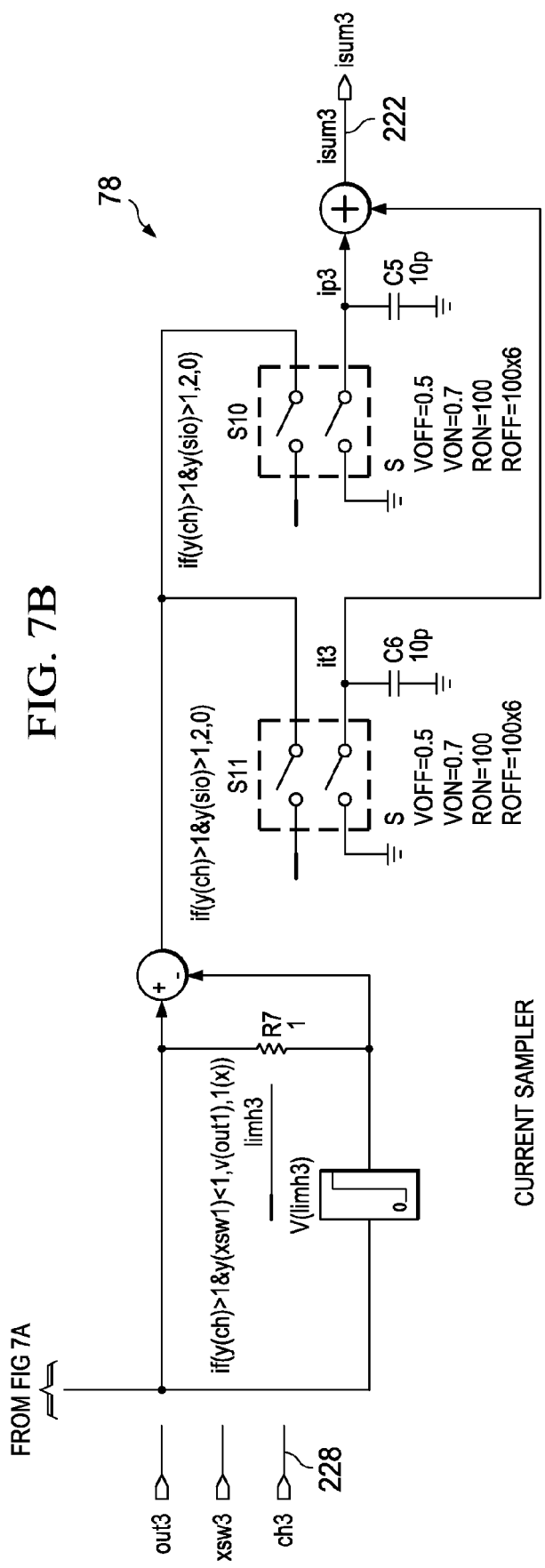

Current Sampler—Isampler1 78:

FIG. 7 is a schematic view of the ISampler1 78 circuit depicted in the control1 38 circuit schematic FIG. 6. Cadence PSPICE has a hierarchical schematic structure capability. The symbol for ISampler1 78 depicted in FIG. 6 has 15 pins with corresponding pin names. For each pin depicted in the Isampler1 78 symbol there is a corresponding pin interface symbol 216 in FIG. 7. There are 15 pins, each with a corresponding pin interface symbol 216 in FIG. 7 that connect the 15 pins of symbol ISampler1 78 of FIG. 6 to the 15 nodes in FIG. 7. Thus the 15 pin nodes from FIG. 6 are electrically connected to 15 corresponding nodes in FIG. 7. FIG. 7 is a detailed schematic of the circuit model used to implement ISampler1 78.

The current sampler Isampler1 78 is a three channel sample and hold circuit with 2 samples taken for each channel. The channels are selected based on the channel outputs ch1 node 110, ch2 node 226, and ch3 node 228 from the channel sequencer 76. When a channel is selected two samples are taken.

Channel 1 Current Sensing and Sampling:

Ch1 node 110 is equal to 2V. Ch2 node 226 and ch3 node 228 are equal to 0.

After the charge cycle, the inductor 20 current is directed through a current sense resistor R3. The voltage across the current sense resistor R3 is monitored by the difference symbol 114, and connected to the peak sample switch 116 and trough sample switch 118. The current sample duration is short which permits the sense element to be a large value resistance and therefore, provide a large current sense gain, large power sample. The energy due to the large power sample is low because the sense element has current flow for a short period of time. The current sense resistor R3 is a 1 ohm resistor for the preferred embodiment. However, the value of the current sense resistor R3 can be selected for high gain or low gain depending on the current levels, estimated noise levels, and scaling that the design requires.

The current sense model permits the inductor 20 current to flow through the current sense resistor R3 only when the ch1 node 110 is greater then 1 and the xsw1 node 62 is less than 1. This is accomplished with the limiter symbol 232 and limits v(limh1) and 0. The output of the limiter symbol 232 is equal to the lx node 58 when the lx node is within the range of the two limit values set by the limiter symbol 232. When 0 is less than the lx node 58, and the lx node 58 is less than limh1 the output of the limiter symbol 232 is equal to the lx node 58 and no current flows through the current sense resistor R3. Once the lx node 58 is greater than limh1, the output of the limiter symbol 232 remains fixed, or limited to limh1, and current flows through the current sense resistor R3 in proportion to the difference between the lx node 58 and the value of limh1.

This approach provides a compact model to enable current sensing only when the lx mode has exceeded the value set by limh1. Limh1 is set equal to the out1 node 68 by the current sense limiter expression. This means that the inductor 20 current is sensed and stored after the parasitic switch capacitances 52 have been charged, eliminating the output current regulation errors that occur due to parasitic switch capacitance in combination with unequal channel voltage levels. The parasitic capacitor charging current is not included in determining the average output current levels.

After the charge cycle, the charge switch 42 is turned off, and the lx node 58 rises rapidly as the inductor 20 current charges the parasitic switch capacitances 52. Once the lx node 58 is greater than the out1 node 68, the current sense resistor R3 is placed in parallel with the parasitic capacitances. Within a short period of time set by the product of the current sense resistor R3 resistance and the parasitic switch capacitances 52, most of the inductor 20 current is flowing through the current sense resistor R3.

The voltage across the current sense resistor R3 is detected by the difference symbol 114, and connected to the peak sample switch 116 and trough sample switch 118. Once the inductor 20 current is flowing in the current sense resistor R3 the peak current sample is taken. This occurs when the ch1 node 110 is greater than 1, and the sip node 106 is greater than 1. When the sip node 106 returns to 0, the peak sample switch 116 is turned off, and the sampled current sense level is held on the peak sample storage capacitor 120. After the peak current is sampled and stored, the first transfer switch 44 is turned on, which changes the limit level limh1 of the limiter symbol 232 from the value of the ch1 node 110 to a value of 100, and the inductor 20 current flows into the load and output filter capacitor. Limh1=100 was selected to disable the limiter symbol 232 because 100 is far greater than the lx node 58 values seen during the charging or transfer periods. For high voltage applications, limh1 should be set sufficiently high to exceed any voltage level seen on the lx node 58 during charge and transfer periods.

Following the transfer cycle, and before the next charge cycle begins, the trough current sample is sampled and stored. The trough current sample is connected to the trough sample storage capacitor 122 by the trough sample switch 118 when the sit node 102 exceeds 1V. The summation symbol 124 adds the value of the ip1 node and it1 node to generate the isum1 node 126 value.

Channel 2 and 3 Current Sensing and Sampling:

When the ch2 node 226 is equal to 2V, and when the ch1 node 110 and ch3 node 228 are equal to 0, the isum2 node 218 value is sampled and stored. The method for sensing, sampling, and storing is similar to the method for sensing, sampling, and storing used for channel 1 described above.

When Ch3 node 228 is equal to 2V. Ch1 node 110 and ch2 node 226 are equal to 0, the isum3 node 222 value is sampled and stored. The method for sensing, sampling, and storing is similar to the method for sensing, sampling, and storing used for channel 1 described above.

Figure 8:
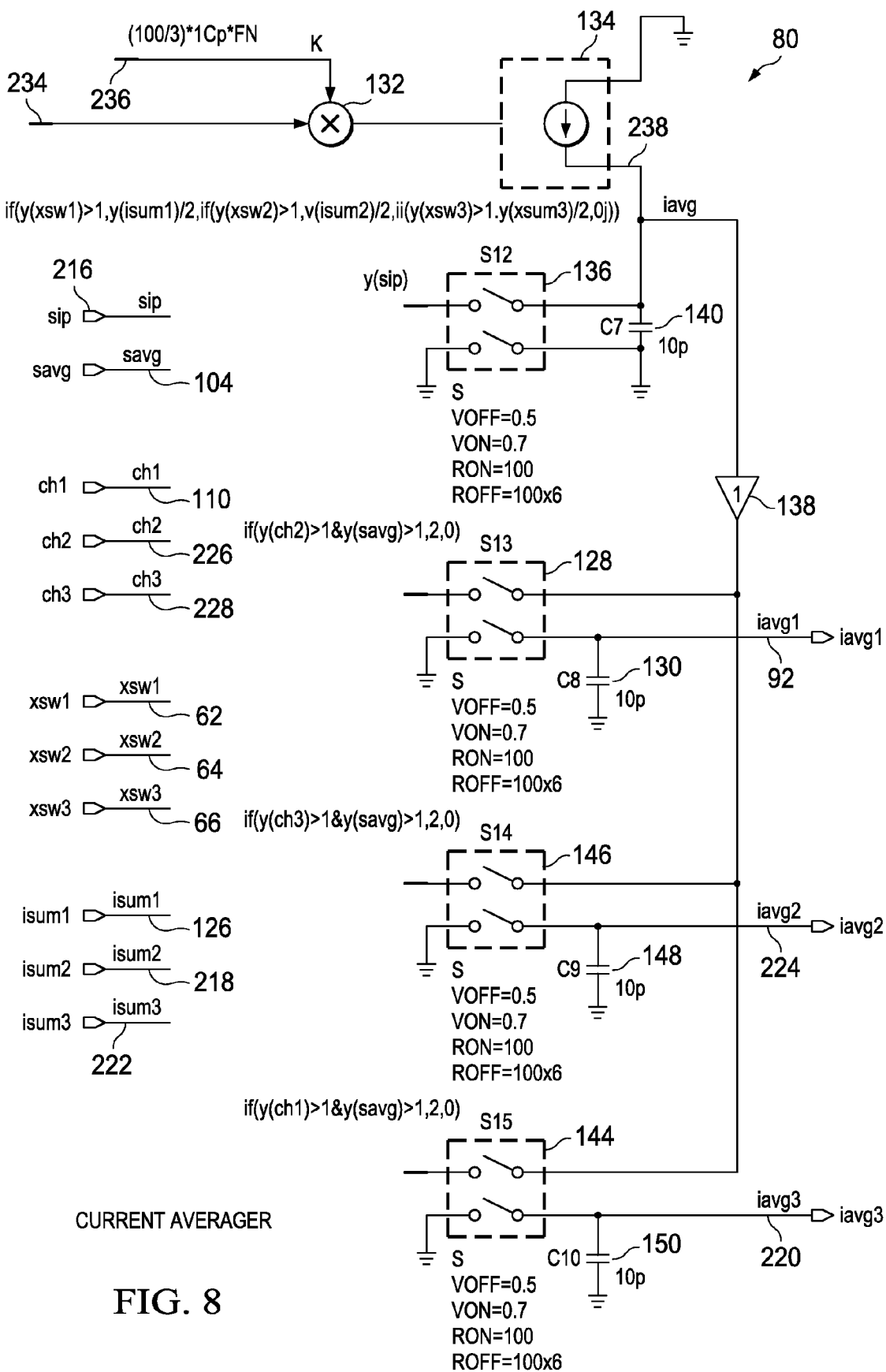
FIG. 8 is a schematic view of an iaverager1 circuit model for a voltage to current converter.

Current Averager—IAverager1 80:

FIG. 8 is a schematic view of the IAverager1 80 circuit depicted in the control1 38 circuit schematic FIG. 6. Cadence PSPICE has a hierarchical schematic structure capability. The symbol for IAverager1 80 depicted in FIG. 6 has 14 pins with corresponding pin names. For each pin depicted in the IAverager1 symbol there is a corresponding pin interface symbol 216 in FIG. 8. There are 14 pins, each with a corresponding pin interface symbol 216 in FIG. 8 that connect the 14 pins of symbol IAverager1 80 of FIG. 6 to the 14 nodes in FIG. 8. Thus, the 14 pin nodes from FIG. 6 are electrically connected to 14 corresponding nodes in FIG. 8. FIG. 8 is a detailed schematic of the circuit model used to implement IAverager1 80.

The IAverager1 80 circuit is comprised of an iavg voltage to current function 134, iavg ramp capacitor 140, iavg reset switch 136, iavg product term 132, ramp current scalar expression 236, and ramp current level expression 234. These elements provide a ramp signal at the iavg node 238. At a prescribed ramping interval, the ramp signal at iavg node 238 provides a value that is proportional to the average current value supplied to the output channel that is operating in transfer mode.

Generating and Storing the iavg1 Node 92 Signal:

Prior to the xsw1 node 62 exceeding the value of 1, the iavg ramp capacitor 140 is reset by turning on the iavg reset switch 136. Once reset is completed, the iavg reset switch 136 is turned off to allow the iavg ramp capacitor 140 to charge starting at nearly zero volts, and ramping up in voltage once the iavg voltage to current function 134 supplies a charging current. When channel 1 is in transfer mode and xsw1 node 62 is greater than 1, the ramp current level supplied by the iavg voltage to current function 134 is set to the value of the isum1 node 126 divided by 2. This result is multiplied by the ramp current scalar expression 236 value to set the current level of the iavg voltage to current function 134. The iavg voltage to current function 134 supplies the charging current to the iavg ramp capacitor 140 to set the rate of change of the iavg node 238 ramp signal.

The voltage at the iavg node 238 ramps up at a rate set by the iavg voltage to current function 134 which provides charging current for the iavg ramp capacitor 140. Voltage at the iavg node 238 continues to ramp up for as long as the xsw1 node 62 is greater than 1. Once the xsw1 node 62 is not greater than 1, the iavg node 238 stops charging the iavg ramp capacitor 140. The iavg ramp capacitor 140 holds the ramp value at the iavg node 238 for storage when the savg node 104 is greater than 1. When the savg node 104 is greater than 1 and, the ch2 node 226 is greater than 1, the first average current sample switch 128 turns on, to sample the value of the iavg node 238. When the first average current sample switch 128 turns off, the sampled iavg node 238 value is held on the first average current level storage capacitor 130 providing the iavg1 node 92 signal. The buffer 138 provides isolation of the iavg ramp capacitor 140 from loading effects due to charging the first average current level storage capacitor 130.

Generating and Storing the iavg2 Node 224 Signal:

Prior to the xsw2 node 64 exceeding the value of 1, the iavg ramp capacitor 140 is reset by turning on the iavg reset switch 136. Once reset is completed, the iavg reset switch 136 is turned off to allow the iavg ramp capacitor 140 to charge starting at nearly zero volts, and ramping up in voltage once the iavg voltage to current function 134 supplies a charging current. When channel 2 is in transfer mode and xsw2 node 64 is greater than 1, the ramp current level supplied by the iavg voltage to current function 134 is set to the value of the isum2 node 218 divided by 2. This result is multiplied by the ramp current scalar expression 236 value to set the current level of the iavg voltage to current function 134. The iavg voltage to current function 134 supplies the charging current to the iavg ramp capacitor 140 to set the rate of change of the iavg node 238 ramp signal.

The voltage at the iavg node 238 ramps up at a rate set by the iavg voltage to current function 134 which provides charging current for the iavg ramp capacitor 140. Voltage at the iavg node 238 continues to ramp up for as long as the xsw2 node 64 is greater than 1. Once the xsw2 node 64 is not greater than 1, the iavg node 238 stops charging the iavg ramp capacitor 140. The iavg ramp capacitor 140 holds the ramp value at the iavg node 238 for storage when the savg node 104 is greater than 1. When the savg node 104 is greater than 1 and, the ch3 node 228 is greater than 1, the second average current sample switch 146 turns on, to sample the value of the iavg node 238. When the second average current sample switch 146 turns off, the sampled iavg node 238 value is held on the second average current level storage capacitor 148 providing the iavg2 node 224 signal. The buffer 138 provides isolation of the iavg ramp capacitor 140 from loading effects due to charging the second average current level storage capacitor 148.

Generating and Storing the iavg3 Node 220 Signal:

Prior to the xsw3 node 66 exceeding the value of 1, the iavg ramp capacitor 140 is reset by turning on the iavg reset switch 136. Once reset is completed, the iavg reset switch 136 is turned off to allow the iavg ramp capacitor 140 to charge starting at nearly zero volts, and ramping up in voltage once the iavg voltage to current function 134 supplies a charging current. When channel 3 is in transfer mode and xsw3 node 66 is greater than 1, the ramp current level supplied by the iavg voltage to current function 134 is set to the value of the isum3 node 222 divided by 2. This result is multiplied by the ramp current scalar expression 236 value to set the current level of the iavg voltage to current function 134. The iavg voltage to current function 134 supplies the charging current to the iavg ramp capacitor 140 to set the rate of change of the iavg node 238 ramp signal.

The voltage at the iavg node 238 ramps up at a rate set by the iavg voltage to current function 134 which provides charging current for the iavg ramp capacitor 140. Voltage at the iavg node 238 continues to ramp up for as long as the xsw3 node 66 is greater than 1. Once the xsw3 node 66 is not greater than 1, the iavg node 238 stops charging the iavg ramp capacitor 140. The iavg ramp capacitor 140 holds the ramp value at the iavg node 238 for storage when the savg node 104 is greater than 1. When the savg node 104 is greater than 1 and, the ch1 node 110 is greater than 1, the third average current sample switch 144 turns on to sample the value of the iavg node 238. When the third average current sample switch 144 turns off, the sampled iavg node 238 value is held on the third average current level storage capacitor 150 providing the iavg3 node 220 signal. The buffer 138 provides isolation of the iavg ramp capacitor 140 from loading effects due to charging the third average current level storage capacitor 150.

Figure 9:
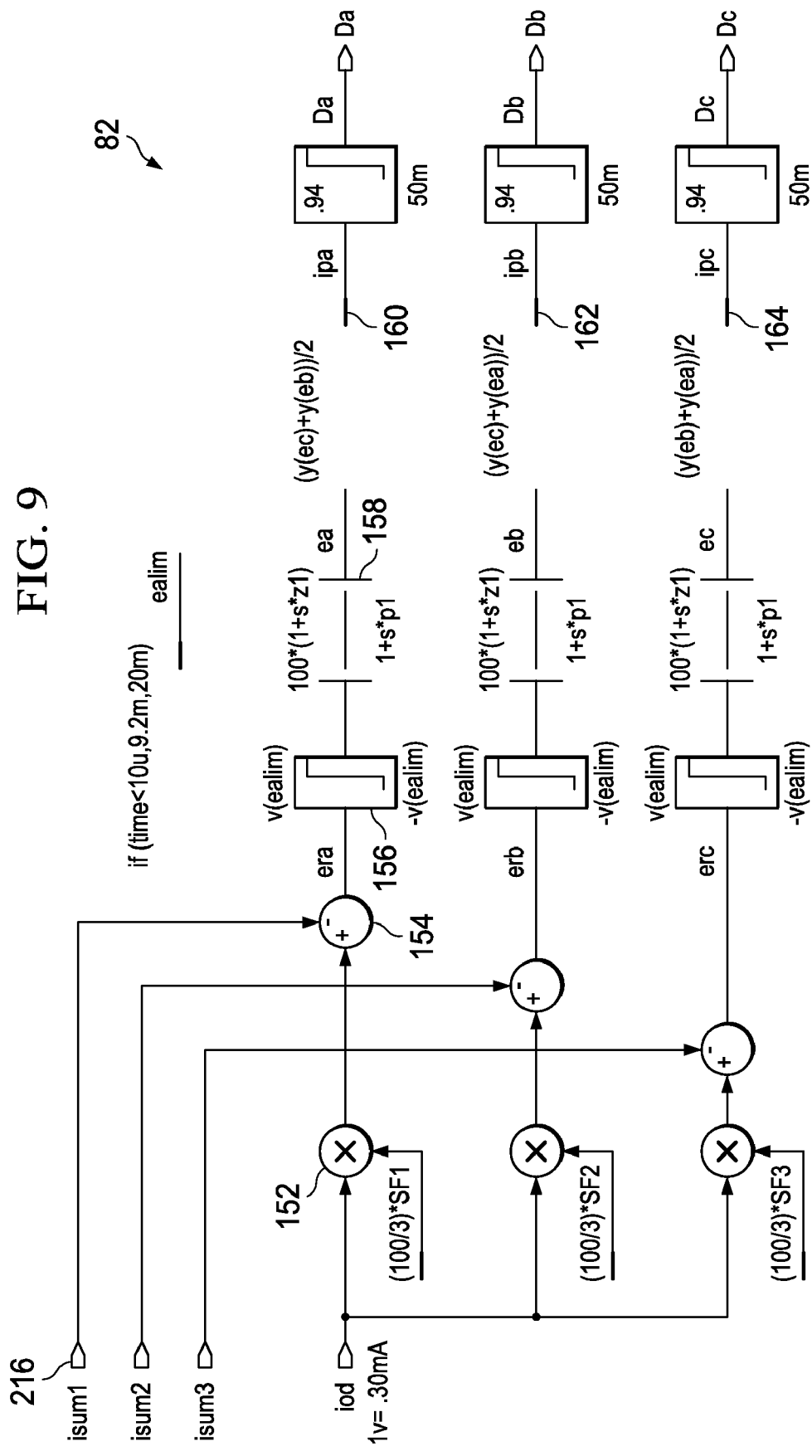
FIG. 9 is a schematic view of an eafilter1 circuit model circuit model for a voltage to current converter.

Error Amplifier Filter—EAFilter1 82:

FIG. 9 is a schematic view of the EAFilter1 82 circuit depicted in the control1 38 circuit schematic FIG. 6. Cadence PSPICE has a hierarchical schematic structure capability. The symbol for EAFilter1 82 depicted in FIG. 6 has 7 pins with corresponding pin names. For each pin depicted in the EAFilter1 82 symbol there is a corresponding pin interface symbol 216 in FIG. 9. There are 7 pins, each with a corresponding pin interface symbol 216 in FIG. 9 that connect the 7 pins of symbol EAFilter1 82 of FIG. 6 to the 7 nodes in FIG. 9. Thus the 7 pin nodes from FIG. 6 are electrically connected to 7 corresponding nodes in FIG. 9. FIG. 9 is a detailed schematic of the circuit model used to implement EAFilter1 82.

The error amplifier filter EAFilter1 82 is comprised of three amplifier filter channels. There is one channel for each output of the converter.

For channel one, the average output current level at the isum1 node 126 is subtracted from the current level threshold provided by the demand multiplier 152 with the difference term 154, and limited by the EA limiter 156. The EA limiter 156 is used to speed the start up of the model by limiting the input to the EA filter 158 when the model has been simulated for less than 10 u seconds. The EA filter 158 filters and amplifies the error signal era.

Channel 2 and 3 operated similarly and provide signals eb and ec respectively. The demand multipliers have scaling factors SF1, SF2 and SF3 from the parameter list 50 that can be set to select a different current level for each output channel.

The duty cycle terms are generated by cross coupling the feedback terms ea, eb, and ec. The duty cycle for Da is generated by the first cross-coupled feedback expression 160, and is based on the average value of eb and ec. The duty cycle for Db is generated by the second cross-coupled feedback expression 162, and is based on the average value of ea and ec. And, the duty cycle for Dc is generated by the third cross-coupled feedback expression 164, and is based on the average value of eb and ea.

The cross coupling of feedback terms is necessary to obtain regulation in a multiple channel system operating in continuous conduction mode. When a channel needs more power it needs a longer transfer cycle while increasing the charge cycles of the remaining channels. In a single output system the transfer cycle is reduced in order to increase the charge cycle, which increases the current level of the inductor 20. Da, Db, and Dc are used to generate the Dx node 98 value which sets the threshold of the PWM 88 which controls the charge and transfer duration for each channel.

Simulation Results:

FIGS. 10-15 show Cadence PSPICE simulation waveforms of the preferred embodiment systems model driving three loads 22. These waveforms are included to illustrate the operation of the voltage to current converter 26 with three loads 22 of varying forward voltage drops. For brevity, the waveforms selected for viewing are a subset of the waveforms available for viewing. The disclosed model together with a Cadence PSPICE simulator provide waveforms for the voltage at all circuit nodes as well as the power and current waveforms for of all circuit components. The circuit model provides a virtual prototype of the voltage to current converter 26, and a means for detailed observation of every voltage, current and power waveform in the converter model. The model simulated with Cadence PSPICE teaches all features and limitations of the preferred embodiment. The waveforms and labeled waveform values are applicable to this specific simulation example. The results presented are not limiting, and are one example of the many possible variations of applications and configuration that are possible by applying the teachings of the invention.

Waveform Call Syntax:

The voltage and current waveforms have waveform symbol markings that correspond to a waveform list at the bottom of each waveform window. The waveforms are called for viewing with the following syntax rules. The voltage at a node x is called by the character string v(x). If the node x is in a circuit schematic of a circuit symbol u1 then the call would be v(u1.x). The current at a component pin y is called by the character string i(y). Details of the syntax for waveform viewing are included by reference to the help sections of the Cadence PSPICE simulation tool software and accompanying manuals.

Figure 10:
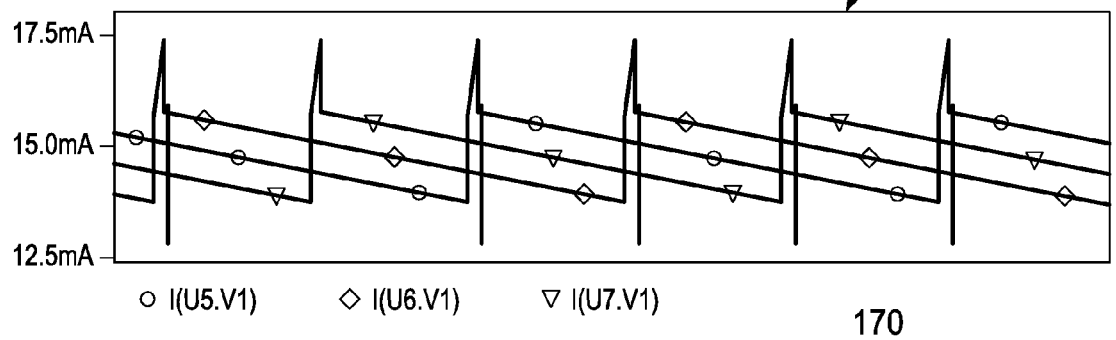
FIG. 10 is a simulation result view of a voltage to current converter spice model showing inductor and load current waveforms.
Figure 10:
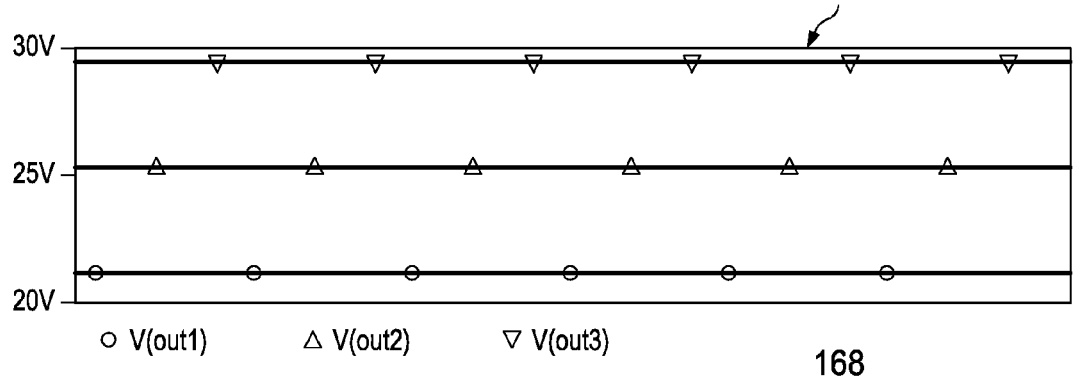
Figure 10:
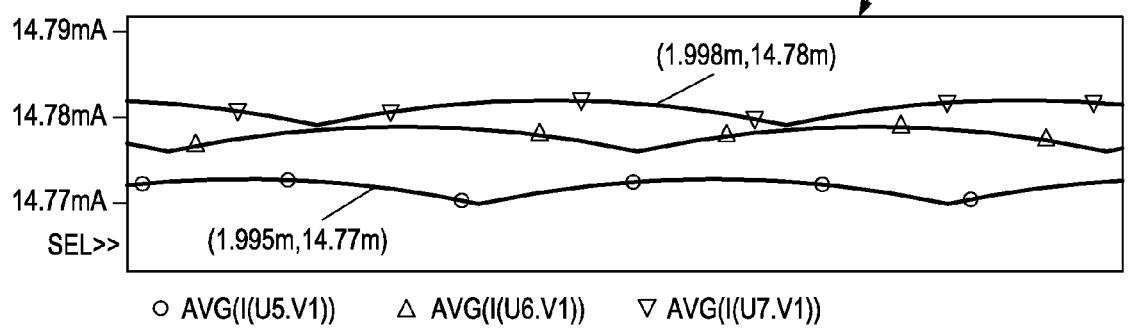
Figure 10:
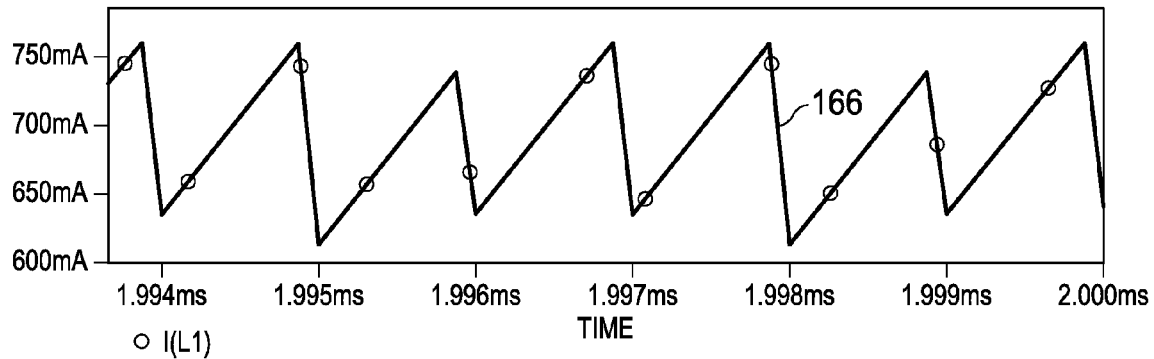

FIG. 10 is a simulation result view of a voltage to current converter 26 spice model showing inductor 20 and load current waveforms 172. The load current waveforms 172 show matching wave shapes displaced in time as each channel is selected to receive current from the inductor 20.

The output voltage waveforms 170 show that each load in the simulation has a different forward voltage drop at the given load current levels. For example the voltage at the output of channel one v(out1) is approximately 21 volts, and the output of channel three v(out3) is approximately 29 volts.

The average load current waveforms 168 are average values of the load current waveforms 172. The labels show 14.77 mA for the channel one load current and 14.78 mA for the channel three load current. The simulation results show a 1 part in 1477, or 0.068% error is current matching. Matching is important for lighting applications where any difference in current matching is perceived as a brightness variation.

The inductor current waveform 166 shows that the converter is altering the duty cycle depending on the channel that is selected for transfer of the inductor 20 current. The inductor current waveform 166 is periodic at one-third the switching frequency of the converter. This occurs because the preferred embodiment is a three channel application.

Figure 11:
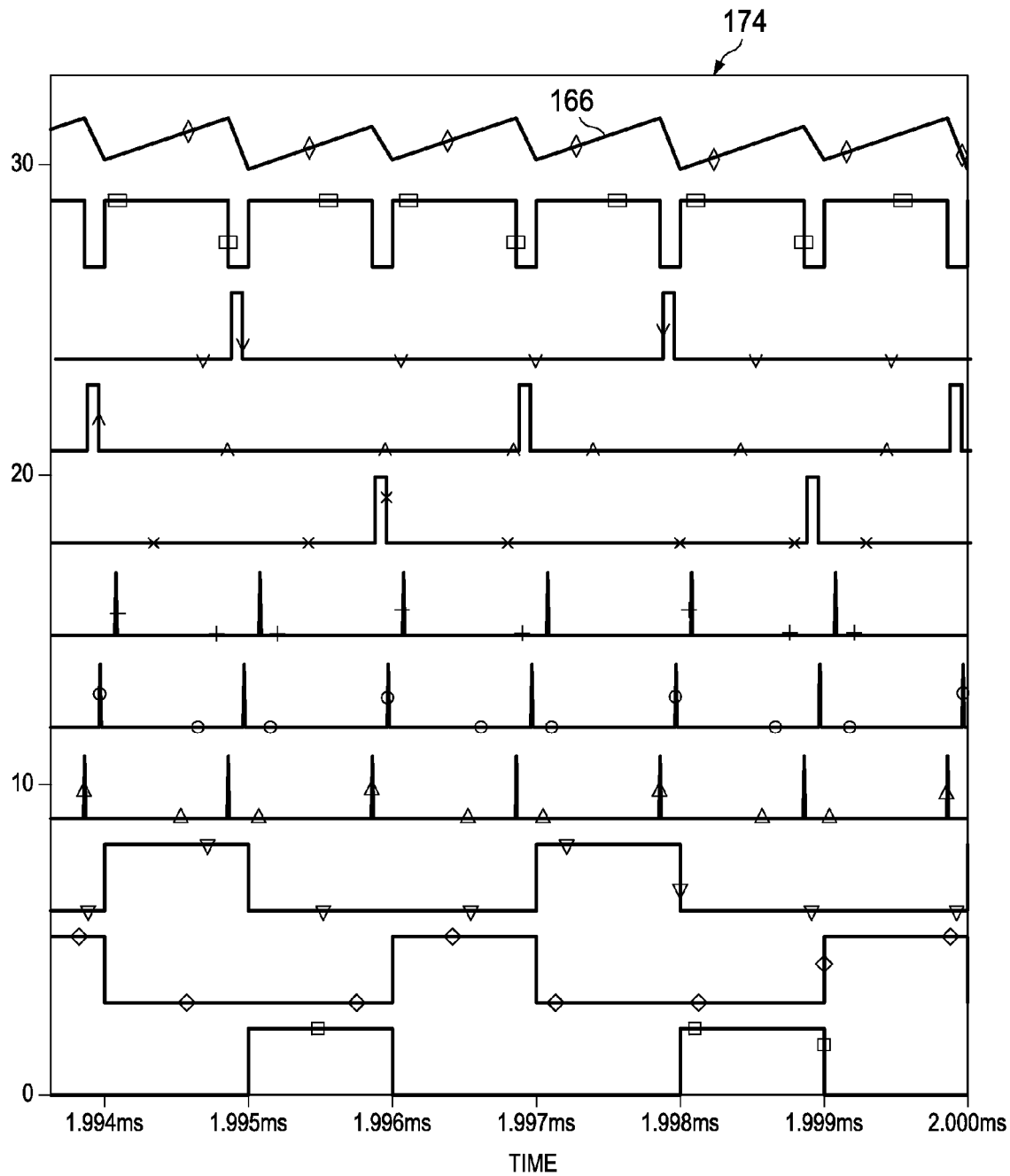
FIG. 11 is a simulation result view of a voltage to current converter spice model showing channel sequencing and logic waveforms.

FIG. 11 is a simulation result view of a voltage to current converter 26 spice model showing channel sequencing and logic 86 waveforms. The control waveforms 174 are shown in relation to the inductor current waveform 166 to illustrate channel selection, and the sampling and switch control waveforms 174 in operation.

Figure 12:
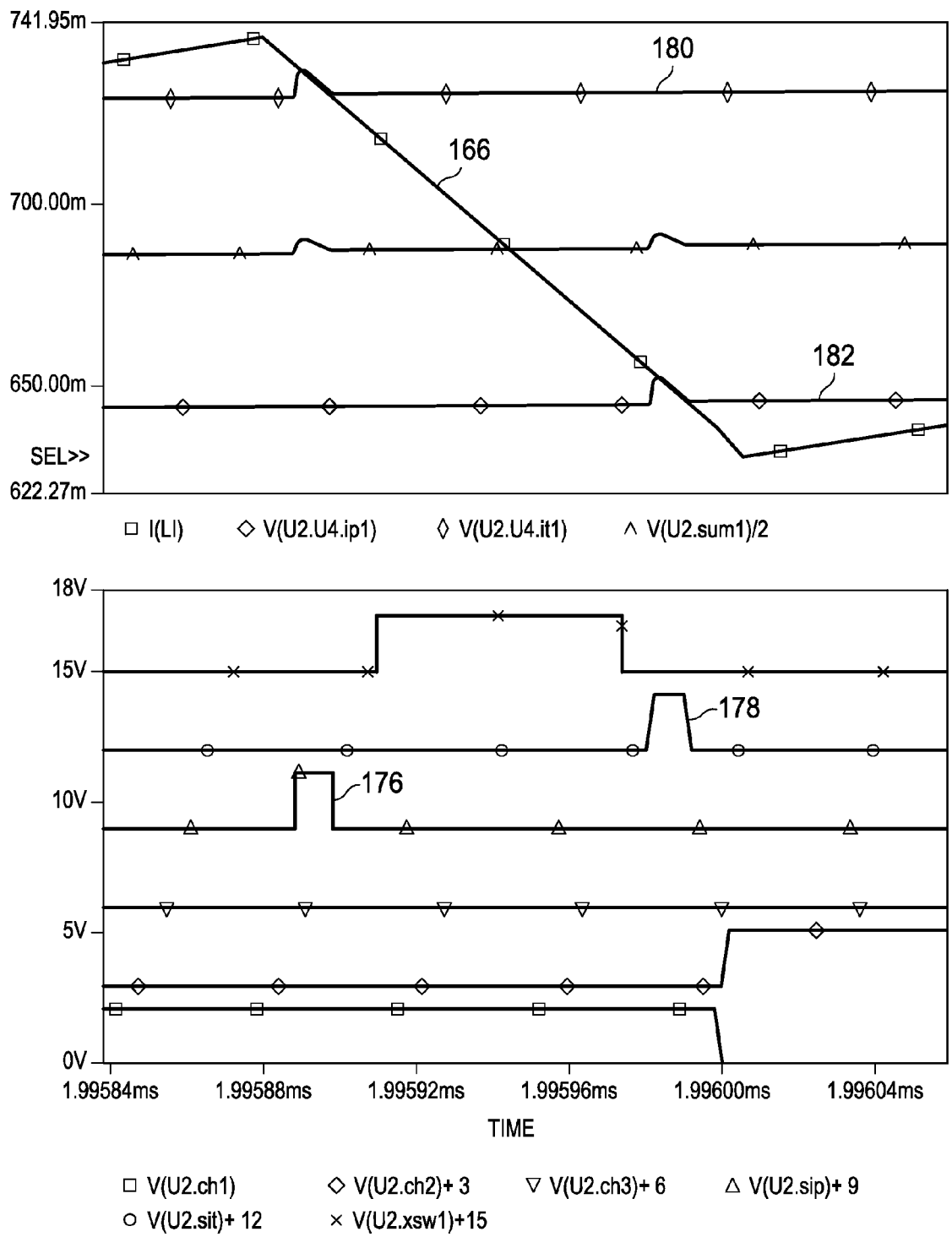
FIG. 12 is a simulation result view of a voltage to current converter spice model showing sampling waveforms.

FIG. 12 is a simulation result view of a voltage to current converter 26 spice model showing sampling waveforms. The inductor current waveform 166, peak current waveform 180, and trough current waveform 182 are shown in relation to the sample peak current waveform 176 and sample trough current waveform 178 control signals. Note that the peak and trough levels can be skewed from the actual inductor 20 current peak and trough current levels. The error caused by this skew is negligible because the inductor current waveform 166 is approximately linear and the sample skewing is symmetrical about the average of the actual inductor 20 current peak and trough values.

Figure 13:
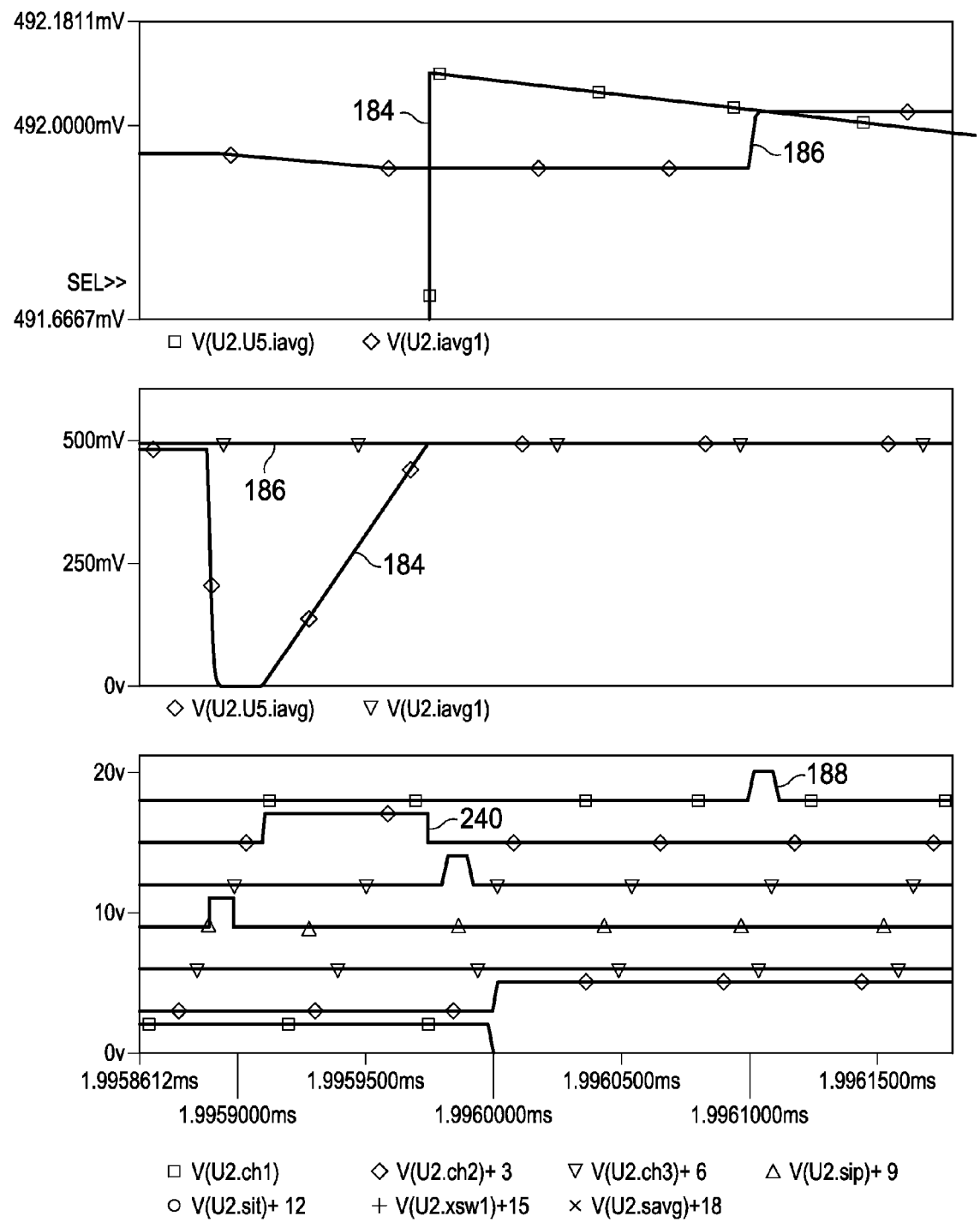
FIG. 13 is a simulation result view of a voltage to current converter spice model showing averaging waveforms.

FIG. 13 is a simulation result view of a voltage to current converter 26 spice model showing averaging waveforms. When the xsw1 waveform 240 goes high the iavg ramp waveform 184 increases linearly until the xsw1 waveform 240 goes low. When the sample average current waveform 188 goes high the buffered iavg ramp waveform 184 value is sampled to generate the iavg1 sample waveform 186.

Figure 14:
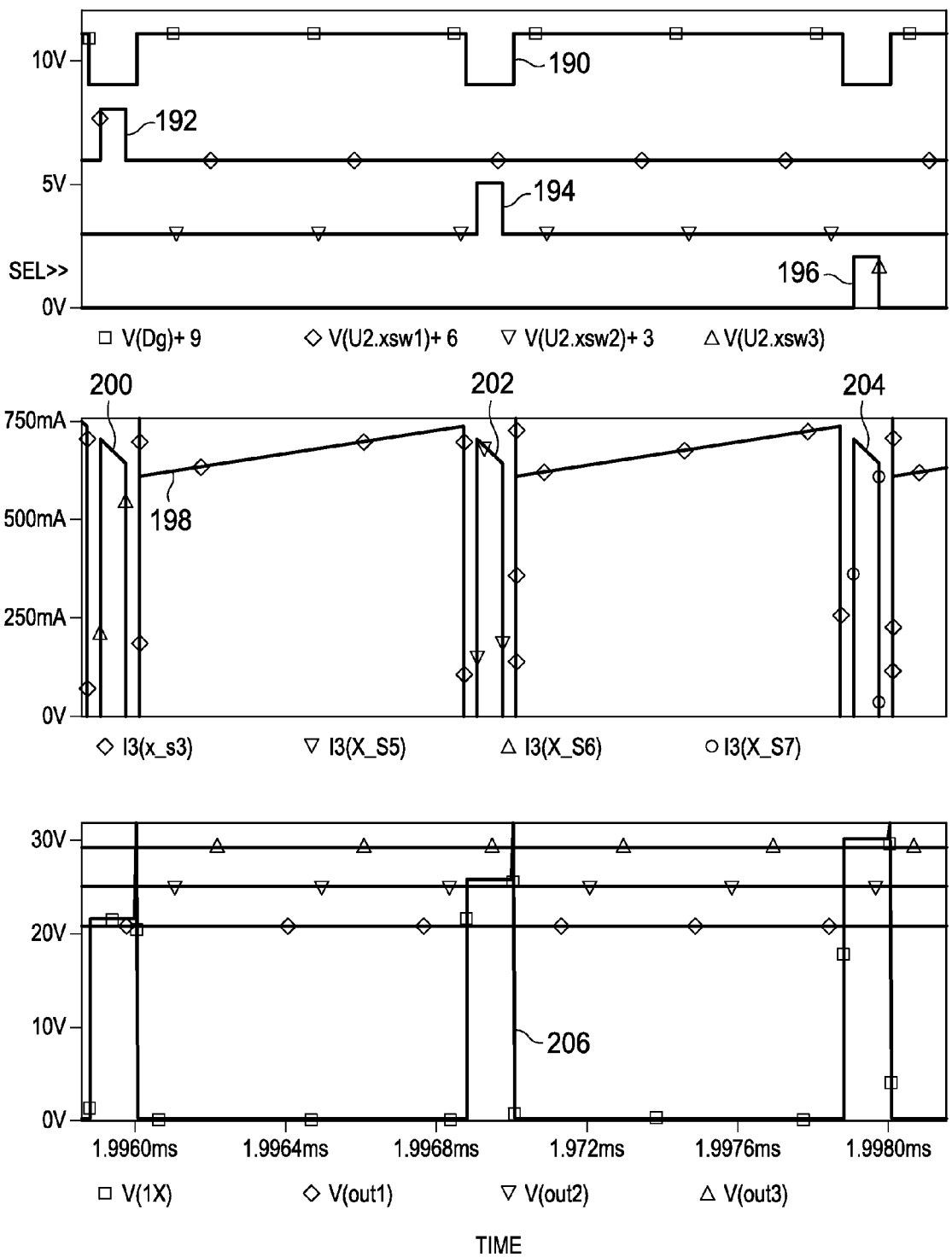
FIG. 14 is a simulation result view of a voltage to current converter spice model showing switching waveforms.

FIG. 14 is a simulation result view of a voltage to current converter 26 spice model showing switching waveforms. The charge switch control waveform 190, first transfer switch control waveform 192, second transfer switch control waveform 194, and third transfer switch control waveform 196 control the inductor 20 switch states to either charge the inductor 20 or discharge the inductor 20 into one of the three output loads 22. The charge switch current waveform 198, first transfer switch current waveform 200, second transfer switch current waveform 202, and third transfer switch current waveform 204 are shown corresponding to the states of the controller waveforms. The 1x waveform 206 is shown in respect to the control signals as each channel is selected for successive transfer cycles.

Figure 15:
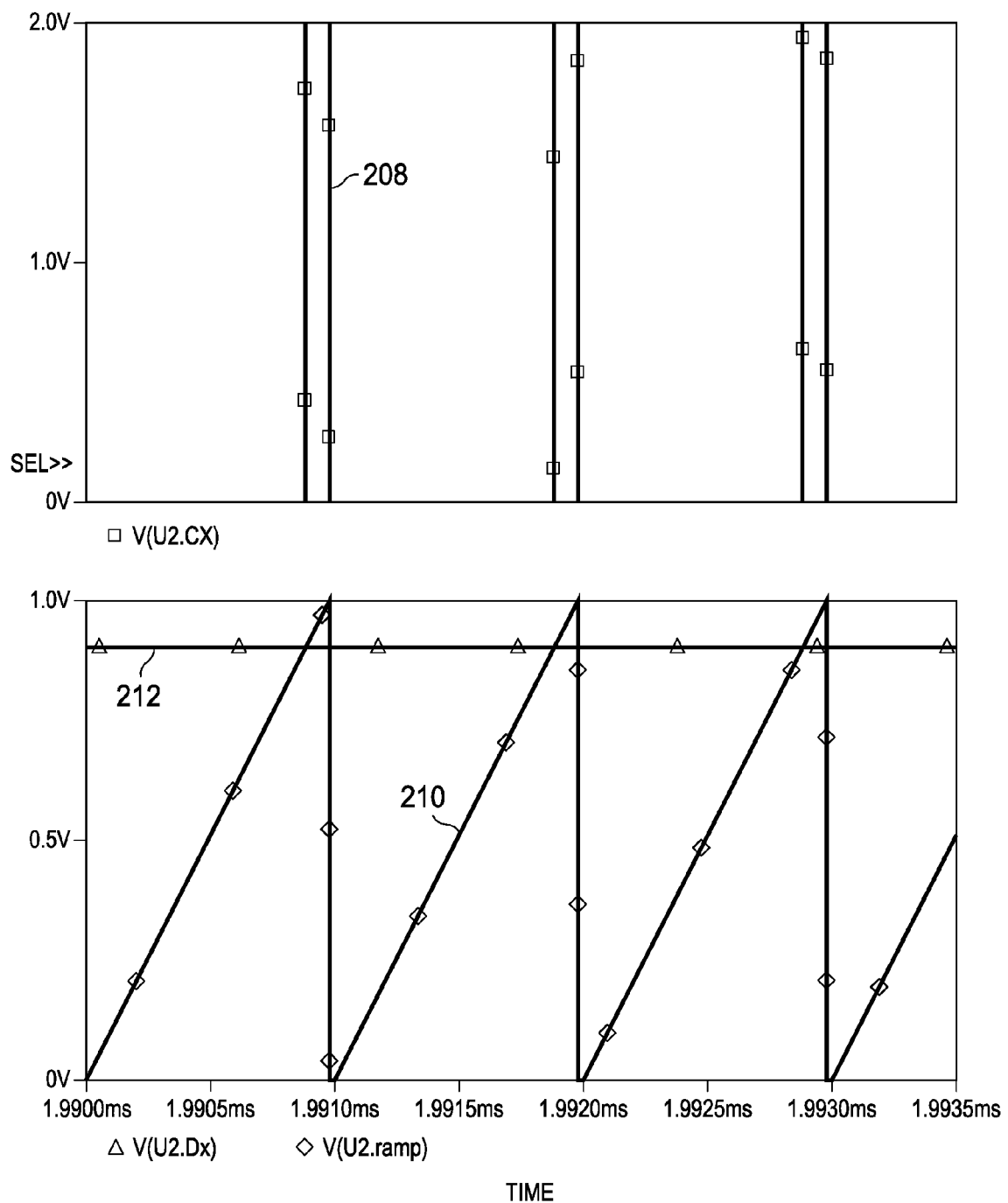
FIG. 15 is a simulation result view of a voltage to current converter spice model showing pulse width modulator waveforms.

FIG. 15 is a simulation result view of a voltage to current converter 26 spice model showing pulse width modulator waveforms. The PWM ramp waveform 210 is a periodic ramp signal that is periodic at the switching frequency of the converter. When the PWM ramp waveform 210 is less than the duty cycle control waveform 212 the charge transfer control waveform 208 is low putting the converter in the transfer state. When the PWM ramp waveform 210 is greater then the duty cycle control waveform 212 the charge transfer control waveform 208 is high putting the converter in the charge state.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. The embodiments, terms, expressions, and methods, described herein are for the purposes of describing one embodiment of the invention, and do not exclude equivalents or impose limitations on the scope of the invention as disclosed. One skilled in the art may conceive of variations, modifications, alternative embodiments, substitute elements, and variations in the methods described that fall within the scope of the invention as disclosed. The utility of the invention is thus not limited.

What is claimed is:

1. A method of voltage to current conversion comprising:
   storing energy in an inductor;
   transferring the stored inductor energy to a load at the transfer rate during a transfer cycle;
   delivering a set output current by sampling the inductor current level at a start and an end of transfer cycle; and
   controlling the transfer rate such that an average load current is controlled by a current set point independent of an output voltage.

2. An apparatus for voltage to current conversion comprising:
   an inductor energy storage device;
   a switch for transferring stored inductor energy to a load at a transfer rate during a transfer cycle;
   a sampler for sampling the inductor current level at a start and end of the transfer cycle;
   a circuit for controlling the transfer rate such that an average load current is controlled by a current set point independent of an output voltage.

3. The method of claim 1, wherein the load is separated into four converter output channels and the method further comprising:
   controlling is controlling output current to set each channel current to a value set by a current set point bus.

4. The apparatus of claim 2, wherein said switch is for transferring stored single inductor energy to a plurality of loads having a diversity of output voltage requirements.

5. The apparatus of claim 4, further comprising a current set point bus.

* * * * *